United States Patent
Sundriyal et al.

(10) Patent No.: US 12,261,890 B2
(45) Date of Patent: Mar. 25, 2025

(54) THREAT CLASSIFICATION IN A STREAMING SYSTEM

(71) Applicant: CrowdStrike, Inc., Sunnyvale, CA (US)

(72) Inventors: Pranav Sundriyal, Aurora, IL (US); William Sherwood, Rochester, NY (US); Andrei Cotiga, Bragaddiru (RO); Adam Freund, Bothell, WA (US)

(73) Assignee: CrowdStrike, Inc., Sunnyvale, CA (US)

(*) Notice: Subject to any disclaimer, the term of this patent is extended or adjusted under 35 U.S.C. 154(b) by 0 days.

(21) Appl. No.: 18/829,996

(22) Filed: Sep. 10, 2024

(65) Prior Publication Data

US 2025/0039245 A1    Jan. 30, 2025

Related U.S. Application Data

(63) Continuation-in-part of application No. 18/227,257, filed on Jul. 27, 2023.

(51) Int. Cl.
*H04L 9/40* (2022.01)

(52) U.S. Cl.
CPC ........ *H04L 63/205* (2013.01); *H04L 63/1416* (2013.01); *H04L 63/1425* (2013.01); *H04L 63/145* (2013.01)

(58) Field of Classification Search
CPC ............... H04L 63/205; H04L 63/1416; H04L 63/1425; H04L 63/145
USPC .......................................................... 726/1
See application file for complete search history.

(56) References Cited

U.S. PATENT DOCUMENTS

| | | | |
|---|---|---|---|
| 8,316,237 B1* | 11/2012 | Felsher | H04L 63/061 380/282 |
| 8,776,218 B2* | 7/2014 | Wright | H04L 63/1416 726/22 |
| 11,704,431 B2* | 7/2023 | Kraus | H04L 63/0414 726/26 |
| 11,757,914 B1* | 9/2023 | Jakobsson | H04L 51/42 726/25 |
| 2003/0084344 A1* | 5/2003 | Tarquini | H04L 63/1416 726/4 |
| 2024/0267400 A1* | 8/2024 | Gazit | H04L 63/1433 |

* cited by examiner

*Primary Examiner* — Badrinarayanan
(74) *Attorney, Agent, or Firm* — Lee & Hayes, P.C.

(57) ABSTRACT

Techniques for identifying data usable for generating security recommendations are discussed herein. A system can determine unique identifiers for events associated with a data stream and determine a frequency of different events occurring in the data stream. The system can generate recommendation data usable for defending the data stream from future malicious events based on a number of similar events occurring over a time period.

18 Claims, 10 Drawing Sheets

THREAT CLASSIFICATION IN A STREAMING SYSTEM

CROSS-REFERENCE TO RELATED APPLICATION

This application is a continuation-in-part claiming priority to U.S. patent application Ser. No. 18/227,257 filed on Jul. 27, 2023, the entire contents of which are incorporated herein by reference.

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
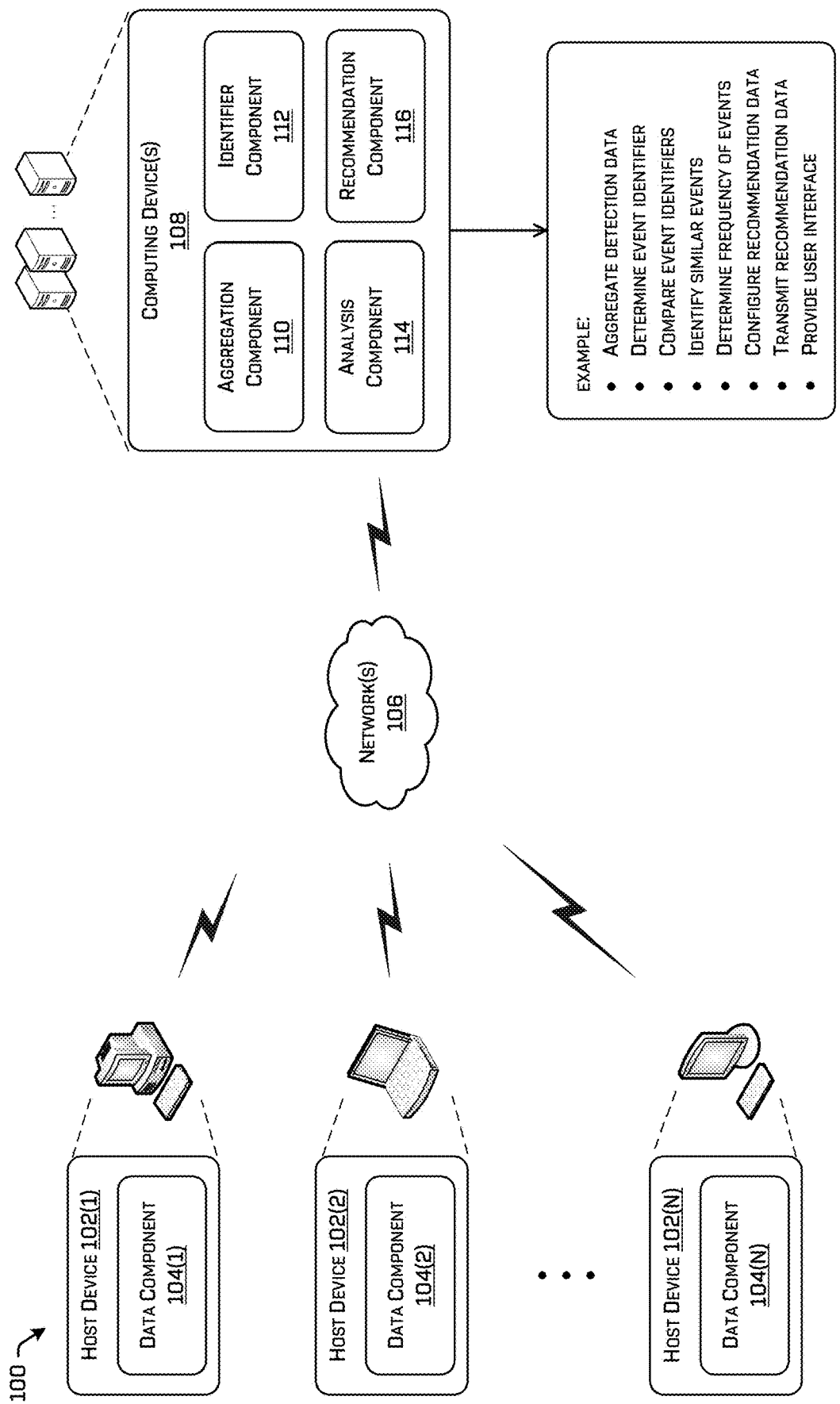
FIG. 1 illustrates an example block diagram of an example computer architecture for generating recommendation data usable to remedy a future malicious event, as described herein.

This application describes techniques for determining recommendation data usable to protect a data stream from potential security threats. The techniques can include a system implementing one or more components to provide recommendations to computing devices associated with a variety of organizations. In various examples, the recommendation can be based on how often an event occurs in a data stream so that events occurring at different frequencies are reported differently. For example, the system can aggregate data associated with data streams of various devices and assign a unique identifier to each event. The system can compare the identifiers (or attributes thereof) and determine which events are within a threshold similarity. The system can configure recommendation data identifying potential security threats (e.g., an unauthorized process, thread, executable, or other activity) in the data streams based on a frequency and/or similarity between events. By implementing the techniques described herein, the system can identify information usable for developing a defense strategy for future malicious events while reducing an amount of urgent recommendations requiring immediate attention (e.g., reduce alert noise to provide a more meaningful alert).

In various examples, the system can determine a key or unique identifier for events detected in a data stream. For instance, the system can implement an identifier component to determine an identifier for an event based on event attributes, metadata describing the event, etc. An event can represent a change in a resource state (e.g., change in a dataset) on a device (e.g., a host device or other computing device). For example, the event can represent a notification (e.g., a new entry was added to a dataset, a new file was added to a directory, an item was purchased, etc.) and/or a state (e.g., file information, metadata, etc.).

In some examples, the system can provide functionality to maintain integrity of a monitored computing device, data stream, etc. by identifying, monitoring, and/or removing events indicative of malicious activity. For instance, techniques used by the system can improve functioning of the computing device by monitoring changes to an entity (e.g., a file, registry, application, data stream, and the like). By way of example and not limitation, the system can perform File Integrity Monitoring techniques to validate and/or verify operation of a monitored entity.

By determining and comparing event identifiers as discussed herein, the system can identify similar events in one or more data streams. In various examples, the system can determine recommendation data that secures the data stream(s) from a future malicious event based on a number of similar events. For example, the system can configure and/or transmit recommendation data based at least in part on the number of similar events occurring over a time period. In examples when an event occurs less than a threshold number of times, the system can send the recommendation data to a host device. In examples when the event occurs equal to or above the threshold number of times, the system can store event information and/or transmit the recommendation data with different levels of urgency based on whether the event is rare or common.

The system can implement an analysis component to determine similarity between two events in a variety of ways including determining that some events are similar despite having identifiers that are in some ways different. The system can determine, for example, that two events are alike because each event include a change to a particular file or registry though the file path or other detail may differ. Additional detail for determining differences or similarities among events (or identifiers associated therewith) can be found throughout this disclosure including the following figures.

Event identifiers can be stored in a storage device for access by one or more components. For instance, the system can include an analysis component configured to compare identifiers one to another and output a number of events that are similar for use during configuration of recommendation data. The system can, for instance, generate an identifier (e.g., a hash value) based on detection data associated with the event (e.g., information identifying one or more of: an operating system, a type of object changed, an operation type, an object path, a filesystem path, just to name a few). Comparing identifiers can include, for example, comparing specific portions of each identifier to identify similarities and/or differences among the identifiers. In various examples, the system can determine which events are alike and/or different, and maintain a total number of events by event type usable for determining security recommendations for a host device.

The system can, for example, comprise one or more computing devices (e.g., a server, a data center, etc.) that aggregate data, identify similar events, and/or generate recommendation data remote from one or more host devices (other computing devices) being monitored. In such examples, a computing device can receive a copy of data stream data associated with the one or more host devices (e.g., directed to the system by a host device). The data stream data can include results of queries that identify a variety of different activity associated with the data stream including, for example, identifying data written to a windows registry, a file system, or a document; or identifying activity associated with an open network socket or a Domain Name System (DNS) look-up, among others. More generally, the activity can represent a process, a thread, code, bytes, a data packet, or an instruction accessing or requesting access to a particular portion of a host device. The system can, for instance, analyze data stream activity and recommend a query, a software update, or other change to remedy a future malicious event. However, in other examples, the host devices can include a component that is configured to perform at least some of the functionality associated with the computing device of the system.

By way of example and not limitation, the system can implement an aggregation component to aggregate data associated with a query initiated by the host device. The query can include query criteria indicating information to "look for" when the query is executed by a processor of the host device. For example, the query criteria associated with the query can be updated to add new functionality, fix a bug, or otherwise improve accuracy of results by the query (or determination therefrom). The query criteria can, in various examples, be determined by a user associated with the host device, a user associated with the system, and/or a model (e.g., a heuristic model, a statistical model, a machine learned model, or the like) of the system or the host device.

Thus, the aggregated data can include a variety of information associated with one or more queries.

In various examples, a query can detect different types of incidents or events that occurred, or are occurring, on the host device over time. The events detected by a host device may or may not include malicious behavior (e.g., adversarial activity, malware, etc.). In some examples, the system may aggregate data for events performed by one or more programs on a monitored host device. As described herein, the data may be analyzed by a same or different system to detect patterns in the events representing a variety of potential security threats.

In some examples, the system can implement a user interface to exchange data with the host devices receiving the recommendation data. The user interface can, for example, enable a user of the host device to send a request for information to better understand how to protect the host device and data streams associated therewith. The user interface can also or instead be configured to receive data from the system for output on a display device. The user interface can include selectable controls to configure reports, identify likely actors, attack techniques, etc. for developing a cloud-based security strategy. In various examples, the host device can receive recommendation data as a service and independent of sending a request for such data.

In various examples, the system can be implemented as a cloud-based service configured to generate or determine values (e.g., a key) for events from various data streams. The system can receive, as input data, a portion of the data stream from a storage device (or receive the portion in real-time independent of the database), such as a data stream database that receives (and in some instances replicates) all data associated with the data stream. By using the techniques described herein, data usable for protecting the host device and/or the data stream can be identified in less time and with more accuracy (e.g., versus relying on a human to analyze and convey the analyzed data to a user of the host device).

In some examples, the user interface is configured to receive an input indicating a request for data, review recommendation data, and/or provide profile information (e.g., details about the organization associated with the host device). In some examples, functionality provided by the system can be implemented responsive to an input received via the user interface (e.g., a request for data associated with previous malicious activity). In various examples, the recommendation data can be based on data aggregated from multiple "like" organizations (e.g., organizations having a score indicating a similarity). The system can, for example, configure the recommendation data for presentation as a visualization in the user interface to convey an author, technique, location, time, purpose, and/or remedy for future malicious activity on the host device. Additional details of generating recommendation data are described in U.S. patent application Ser. No. 18/203,603, filed on May 30, 2023, entitled "Threat Prediction in a Streaming System," which is incorporated herein by reference in its entirety and for all purposes.

The techniques described herein can improve functioning of a computing device by providing an efficient method for generating and reporting recommendation data in a data stream associated with a computing device. For example, the computing device can determine which activity in a data stream to report as potentially malicious based on a number of similar events occurring in computing devices across different organizations, clouds, and/or environments. In some examples, the techniques can include refraining from sending data over a network based on a number of detected events thereby saving computational resources (e.g., a memory, a processor, and the like), network capacity, etc. to generate and/or transmit a recommendation. Further, performing the techniques by the system can improve a computer network by reducing an amount of data transmitted over the computer network to generate and/or transmit recommendation data.

Although in some examples the system comprises a computing device monitoring a host device, in other examples, the system may enable the techniques described herein to be performed by the host device independent of the computing device and/or independent of a network connection. That is, either the host device and/or the computing device may implement one or more components to aggregate, analyze, and generate security information usable to prevent a possible malicious event in the future.

In various instances, a computing device may install, and subsequently execute a security agent as part of a security service system to monitor and record events and/or patterns on a plurality of computing devices in an effort to detect, prevent, and mitigate damage from malware or malicious attack. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent can, for instance, reside on the host device, observe, and analyze events that occur on the host device, and interacts with a security system to enable a detection loop that is aimed at defeating all aspects of a possible attack.

Some examples herein relate to detecting malware or malicious behavior by, for example, recording events performed by a processor executing one or more programs and analyzing distributions of the events by event type (e.g., a type of process, a type of thread, or lateral movement between host devices). For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware. Of course, the techniques can also be used to detect single, non-repetitive, instances that may occur in the data stream (e.g., at different computing devices).

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example block diagram 100 of an example computer architecture for generating recommendation data usable to remedy a future malicious event, as described herein. The diagram 100 may include one or more host device(s) 102(1), 102(2), . . . , 102(N) (individually and/or collectively referred to herein with reference 102), where N is any integer greater than or equal to 1, that interact with the computing device(s) 108 of a system (e.g., a service system, a security system or a combination thereof) over a network(s) 106. In various examples, the system may be associated with a cloud-based service network that is configured to implement aspects of the functionality described herein.

In some examples, the system can implement or otherwise perform File Integrity Monitoring to monitor an entity (e.g., one or more files) for malicious event(s). For instance, the system can perform File Integrity Monitoring to detect changes in one or more files of an operating system, a registry, or the like, that are indicative of malicious activity. Data output as a result of performing the File Integrity Monitoring can include one or more indications of a malicious process or thread in the event and/or metadata, for example. Results of performing File Integrity Monitoring can be used as input into a model and/or component that is configured to determine an identifier for the event, as discussed herein.

In some examples, File Integrity Monitoring can be offered as a service to detect and validate events to maintain integrity of a computing device (or portions thereof) (e.g., pro-actively identify malicious activity). Though this example is discussed in the context of File Integrity Monitoring, the system can also or instead implement other integrity monitoring and/or file verification techniques.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 108 communicate over the network(s) 106 using a secure protocol (e.g., https) and/or any other protocol or set of protocols, such as the transmission control protocol/Internet protocol (TCP/IP).

The host device 102 (also referred to as "host computing device," "host device," or "monitored computing device") may implement one or more data components 104(1), 104(2), . . . , 104(N) (individually and/or collectively referred to herein with reference 104, where N is any integer greater than or equal to 1), which is stored in memory of the host device 102 and executable by one or more processors of the host device 102. The host device(s) 102 may be or include any suitable type of host devices 102, including, without limitation, a mainframe, a work station, a personal computer (PC), a laptop computer, a tablet computer, a personal digital assistant (PDA), a cellular phone, a media center, an embedded system, a robotic device, a vehicle, a Machine to Machine device (M2M), an unmanned aerial vehicle (UAV), an Internet of Things (IoT), or any other type of device or devices capable of communicating via an instance of the data component 104. An entity may be associated with the host devices 102, and the entity (e.g., user, computing device, organization, or the like) may have registered for security services provided by a service provider of the computing device(s) 108.

The data component 104 can represent software, firmware, hardware, or a combination thereof, that is configured to exchange data with the computing device(s) 108, and the components thereof. In some examples, the data component 104 can be configured to send or receive data associated with a query (or other data for aggregation) to and/or from the computing device(s) 108. The data component 104 can cause a portion of the data stream data (and events therein) to be sent to the computing device(s) 108. In some examples, the data component 104 can cause a query to execute on the data stream at the host device 102.

In some examples, the computing device(s) 108 can determine identifiers for events in a data stream as described herein independent of the host device 102 including the data component 104. In other words, the host device(s) 102 need not include the data component 104 for the computing device(s) 108 to implement the techniques described herein.

The data component 104 may provide functionality for the host device 102 to interface with the computing device(s) 108 sufficient to request security recommendations, receive recommendation data, and/or manage a profile, just to name a few. For example, the data component 104 can establish a branch of the data stream for sending to the computing device(s) 108.

The data component 104 may, in some examples, be kernel-level security agents, or similar security application or interface to implement at least some of the techniques described herein. Such kernel-level security agents may each include activity pattern consumers that receive notifications of events in a query that meet query criteria. The kernel-level security agents may each be installed by and configurable by computing device(s) 108, receiving, and applying while live, reconfigurations of agent module(s) and/or an agent situational model. Further, the kernel-level security agents may each output query results to the computing device(s) 108 that include the security-relevant information determined by the data component 104. The data component 104 may continue to execute on the host device 102 by observing and sending detected activity to the computing device(s) 108 while the host device 102 is powered on and running.

In some embodiments, the data component 104 may be connected to the computing device(s) 108 via a secure channel, such as a virtual private network (VPN) tunnel or other sort of secure channel and may provide query results security-relevant information to the computing device(s) 108 through the secure channel. The data component 104 may also receive configuration updates, instructions, remediation, etc. from the computing device(s) 108 via the secure channel.

The host device 102 may receive the data component 104 over the network(s) 106 from the computing device(s) 108 by downloading the data component 104 as a software package to be installed on the host devices 102. Together, the data component 104 of the host devices 102 and the computing device(s) 108 form a detection loop, which can be enabled by an agent architecture designed in accordance with the principles of the well-known OODA-loop (i.e., observe-orient-detect-act-loop). The data component 104 may include components that receive and/or send notifications of semantically interesting query results (e.g., file writes and launching executables) from host operating system hooks or filter drivers, from user-mode activity pattern monitors, or from threads monitoring log files or memory locations. Thus, the data component 104 may observe data stream activity such as query results (e.g., activity patterns over time), determine actions to take based on those query results, and/or send the query results to the computing device(s) 108 for further analysis.

The detected activity observed by the data component 104 (e.g., query results, and the like) may be sent over the network(s) 106 to the computing device(s) 108, with or without further processing by the data component 104. For example, in some embodiments, the detected activity observed by the data component 104 may be filtered using first configurable filters of the data component 104 to remove known safe activity patterns to help reduce size of data transfer and then sent to the computing device(s) 108. Alternatively, the detected activity can be sent to the computing device(s) 108 without further filtering on the host devices 102.

The data component 104 of the host device 102 may trigger varying levels of containment for the host device 102 based on varying levels suspicious events in an input data stream. In response to determining that the host device 102 is compromised (e.g., an incident is found in the event results), the computing device(s) 108 can send a containment instruction over the network 106 to the host device 102. Upon receipt of this containment instruction, the data component 104 may cause the host device 102 to enable (activate, trigger, etc.) network containment.

To enable network containment on the host device 102, the data component 104 can implement a firewall policy included with the data component 104. Upon enforcement of the firewall policy, a firewall of the host device 102 denies outgoing data packets from, and incoming data packets to, the host device 102 that would have been allowed prior to the implementing of the firewall policy. In some embodiments, the firewall policy, May deny all traffic to and from the host device 102 with respect to other computing systems having remote network addresses (e.g., Internet Protocol (IP) addresses) that are not otherwise specified in the firewall policy as an exception for allowed traffic. In various embodiments, however, network containment can be implemented on the host device 102 in a manner that allows some communication to/from the host device 102 with a network other than the network 106. For example, the firewall policy can specify exceptions for remote network addresses (e.g., third parties) that are allowed to communicate with the host device 102 after containment is enabled/initiated and while the host device 102 remains contained. The firewall policy may allow some traffic to and from the computing device(s) 108 so that a communication channel remains open and usable between the host device 102 and the computing device(s) 108, even when the host device 102 is "contained" (or cutoff from communicating with the other host device(s) 102 besides the computing device(s) 108). To accomplish this result, the firewall policy can specify at least one remote network address (e.g., a remote IP address) associated with the computing device(s) 108, and may specify an action to allow outgoing data packets to, and incoming data packets from, the computing device(s) 108, which may be associated with the at least one remote network address that can be specified in the firewall policy. In some embodiments, the containment instructions may specify an action to block a specific suspicious activity pattern rather than trigger network containment if the suspicious activity pattern is limited in action.

In various examples, the computing device(s) 108 may include functionality to receive data associated with one or more data streams and extract information from an event. The computing device(s) 108 can determine an identifier for each event identified in the received data (e.g., detection data) based on the extracted information. The computing device(s) 108 may in the analyze the identified events, query results (or observed events therein) received from host device(s) 102, to preemptively identify a defense for suspicious data activity such as malware or malicious code found in the host device(s) 102.

In numerous examples, the computing device(s) 108 can receive profile data as input which identifies an organization, an actor of a previous malicious event, a visualization, and/or recommendation. For example, a profile component (not shown) can generate, store, send, or otherwise manage profile data which can comprise one or more of: organization profile information, actor information, technique information, or recommendation information, among others. The recommendation profile can include current and previous recommendations for analysis to generate a recommendation pattern over time which may be used to improve how to predict a future malicious event and/or to determine useful recommendation data for a particular time.

As shown in FIG. 1, the computing device(s) 108 may include an aggregation component 110, an identifier component 112, an analysis component 114, and a recommendation component 116 to perform the functionality described herein.

Aspects of the processing operations may be parallelized and input to a parallel processor unit (such as a GPU) for efficient processing. Accordingly, implementing the techniques described herein can efficiently make use of available computational resources (e.g., memory and/or processor allocation or usage) while also improving accuracy of predictions. In some examples, the computing device(s) 108 can allocate input data to a parallel processor unit (e.g., a CPU, GPU, or the like capable of processing input data at substantially a same time). For example, the aggregation component 110, the identifier component 112, the analysis component 114, and/or the recommendation component 116 can determine at least some of the identifiers, analyze the identifiers, and/or determine a frequency of events, etc. in parallel by the parallel processor unit.

In various examples, the aggregation component 110 may aggregate data usable to generate or otherwise determine recommendation data. In various examples, the aggregation component 110 may receive data (e.g., detection data, event data, query data, organization profile data, etc.) from various sources for processing by one or more models or components associated with the system. The aggregation component 110 can, for example, retrieve data from a data stream, a database, a host device, a memory, and/or a storage device associated with the system.

In some examples, the aggregation component 110 may receive profile data comprising profiles for different organizations in which an example profile includes one or more of: a location of the computing devices operated by the organization, a geographic location(s) of the organization (e.g., country, geographic region, etc.), a size of the organization (e.g., a number of employees), an organization type (e.g., a description of the service provided by the organization), data infrastructure information (e.g., a number of computing devices, type of software, hardware, etc. used by each computing device, computer architecture, etc.), or subsidiary information (e.g., a business related or owned by the organization).

In some examples, the aggregation component 110 may receive detection data (e.g., observed activity patterns in a data stream) associated with events from the host device(s) 102 for analysis by a component of the computing device(s) 108 and/or the host device 102.

In some examples, a storage device (not shown) can store the detection data received from the data component(s) 104 on the host device(s) 102, and the like. In various examples, the storage device can store event information associated with a dynamically changing data stream for access to determine recommendations, or for other reasons.

The identifier component 112 represents functionality to determine an identifier for each event associated with input data (e.g., the detection data) received from one or more of the host devices 102 over a time period. For example, the identifier component 112 can receive metadata for each event and apply a hash function to the metadata to determine a key that identifies the event relative to another event. For instance, the identifier component 112 can determine a value representing a combination of some or all of the metadata received as input. The value can be a hash value that is generated by ordering metadata in a sequence of information and determining the value to represent the sequence of information. In various examples, the metadata can comprise one or more of: an operating system identifier (e.g., of the host device being monitored), a type of object changed (file, registration key, etc.), an operation type (create, write, etc.), an object path, a filesystem path, a registry path, a new object path, a process name, process name (path base of Process Image File Name), a user identifier (user identifier for windows, user name for Linux), etc. In various examples, the identifier can be determined based at least in part on applying a hash function to a username, a file path, and an operating system associated with an event received as input.

The identifier component 112 can assign a weight to different metadata, and determine the identifier based at least in part on the weights assigned to the types of metadata (or other input data). For instance, a higher weight may be assigned a type of object changed than a weight assigned to a filesystem path, or other information. In this way, keys can be generated with values in a particular order which can also or instead be considered by the analysis component 114 when comparing two identifiers, determining similarity between the respective events, etc.

By way of example and not limitation, the analysis component 114 may determine that a first identifier associated with a first event and a second identifier associated with a second event are similar (e.g., within a threshold amount) by comparing the first and second identifiers. For instance, the first and second events may be considered similar for further processing (e.g., determining a number of similar events) based on sharing a same object change type even if the filesystem path is different (e.g., the filesystem path can have a lower weight than the weight of the object change type).

In some examples, the identifier component 112 can determine an event identifier responsive to receive the detection data from the host device 102. For instance, the identifier component 112 can determine event identifiers substantially in real-time as the identifier component 112 receives input data.

Generally, the analysis component 114 can represent functionality to analyze data received from one or more other components of the computing device(s) 108. For example, the analysis component 114 can analyze or compare the identifiers associated with the events received from the host device(s) 102. The analysis component 114 can also or instead identify similar events by comparing the event identifiers. In various examples, the analysis component 114 can determine how many "similar" events are occurring in the data stream at a particular time. Given that the data stream changes dynamically so can a number of similar events determined by the analysis component 114.

In various examples, the analysis component 114 can assign a weight to different attributes of an event, and compare the weights to determine a value indicative of a similarity score. Attributes may include an operating system identifier of the computing device, a type of object changed, an operation type, an object path, a filesystem path, a registry path, a new object path, a process name, a creation time of the event, or a user identifier, just to name a few. For instance, attributes such as a type of object changed, or an operation type may be weighted higher than another attribute such as a process name or user identifier. In some examples, the recommendation component 116 can compare the value to a threshold value such that values within a range of the threshold value can be considered sufficiently alike for configuring or providing the recommendation information for a host device. Weights may be determined by a user and/or a model and update over time.

As mentioned, the analysis component 114 can determine a frequency of an event (or "alike" events) occurring in a data stream over time. The analysis component 114 can, for example, receive identifiers associated with multiple events from the identifier component 112 and/or from a storage device for analysis. Two identifiers (e.g., hash values) can be compared by, for example, examining similarities and/or differences between the identifiers. The analysis component 114 can output a classification indicating similarity between two events (e.g., are the events related within a threshold? yes or no). Upon determining that events are similar, the analysis component 114 can determine a number of events occurring in the host device 102(1) as well as a number of like events occurring in other host devices in a same and/or different organization.

The analysis component 114 can also or instead output a classification for an event based on the number of occurrences of the event (or like events). For example, a first classification can correspond to a first range of occurrences for the event, and a second classification can be output if the number of occurrences of the event falls into a second range. By way of example and not limitation, the analysis component 114 can output a first classification (e.g., "unique") when the number of occurrences of the event is within the first range (e.g., between 1-3), and output a second classification (e.g., "common") when the number of occurrences of the event is within the second range (e.g., 3-10, above 10), and so on. In various examples, the recommendation component 116 can configure recommendation data based at least in part on the classification for the event.

Generally, the recommendation component 116 represents functionality to generate recommendation data for sending to the host device(s) 102. In some examples, the recommendation data can indicate one or more of: a vulnerability exposed during a previous malicious event, an actor that initiated the previous malicious event, and/or malware executed in association with the previous malicious event, just to name a few. The recommendation data can, for example, indicate a portion of the data stream (or host device) that is most likely to be targeted in a future malicious event, an actor most likely to cause malicious behavior on the host device, techniques likely to be used, etc. In various examples, the recommendation data can include a visualization of potential security threats for output by a display device of the host device(s) 102.

The recommendation component 116 can, for example, receive data from the analysis component 114 representing one or more classifications, number of similar events, etc. In various examples, the recommendation component 116 can determine whether to generate and/or transmit recommendation data based on the classification. For instance, the recommendation component 116 can generate a first instruction to cause a first action (e.g., to transmit the recommendation data) based on receiving an indication of the first classification, and generate a second instruction to cause a second action (e.g., to store the recommendation data and/or to refrain from transmitting the recommendation data, etc.). Thus, the classifications can be used to limit or select recommendation data for transmitting to a host device over a network.

In some examples, a user (e.g., an analyst) and/or a model associated with the computing device(s) 108 can provide input to the recommendation component 116 to verify accuracy of the recommendation data and/or to update the recommendation data prior to transmission. By way of example and not limitation, the recommendation component 116 can receive profile data from the storage device usable for configuring the recommendation data (e.g., to tailor security recommendations).

The recommendation component 116 can implement a model that is configured to receive identifier data, event data, and/or profile data as input, and output recommendation data that includes information indicating a portion of the data stream to protect from being a target of a future malicious event. For example, the recommendation component 116 can determine information describing the malicious event such as one or more of: a location of the malicious event (e.g., a portion of the data stream or host device having experienced a previous attack), an organization(s) from which data was used to generate the recommendation data, the organization type, a creation time of the recommendation data, etc.

The model implemented by the recommendation component 116 can also be configured to receive detection data as noted elsewhere herein. For example, the detection data can include one or more of: event information in a first data stream associated with a first computing device of a first organization, second event information in a second data stream associated with a second computing device of a second organization, technique information identifying one or more techniques associated with the event in the first data stream or the second data stream, and/or author information identifying one or more authors associated with the event (e.g., a malicious process or thread in the first data stream or the second data stream).

In various examples, the computing device(s) 108 (e.g., the aggregation component 110, the identifier component 112, the analysis component 114, and/or the recommendation component 116) can implement a machine learned model to predict similarity between event identifiers, for example. For example, attributes or portions of the metadata can be compared, put into a sequence, and/or weighted based at least in part on an output from a machine learned model.

In some instances, a training component (not shown) may be executed by one or more processor(s) of a computing device to train a machine learning model based on training data. The training data may include a wide variety of data, such as computer behavior data, query result data, historical data, visualizations of a security threat, or a combination thereof, that is associated with a value (e.g., a classification of interest, inference, prediction, etc.). Such values may generally be referred to as a "ground truth." To illustrate, the training data may be used for determining presence of a potential security impact to operation of a computing device in a data stream and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

Though depicted in FIG. 1 as separate components of the computing device(s) 108, functionality associated with the aggregation component 110, the identifier component 112, the analysis component 114, and/or the recommendation component 116 can be included in a different component of the service system or be included in the host device(s) 102. In some instances, the components described herein may comprise a pluggable component, such as a virtual machine, a container, a serverless function, etc., that is capable of being implemented in a service provider and/or in conjunction with any Application Program Interface (API) gateway.

Figure 2:
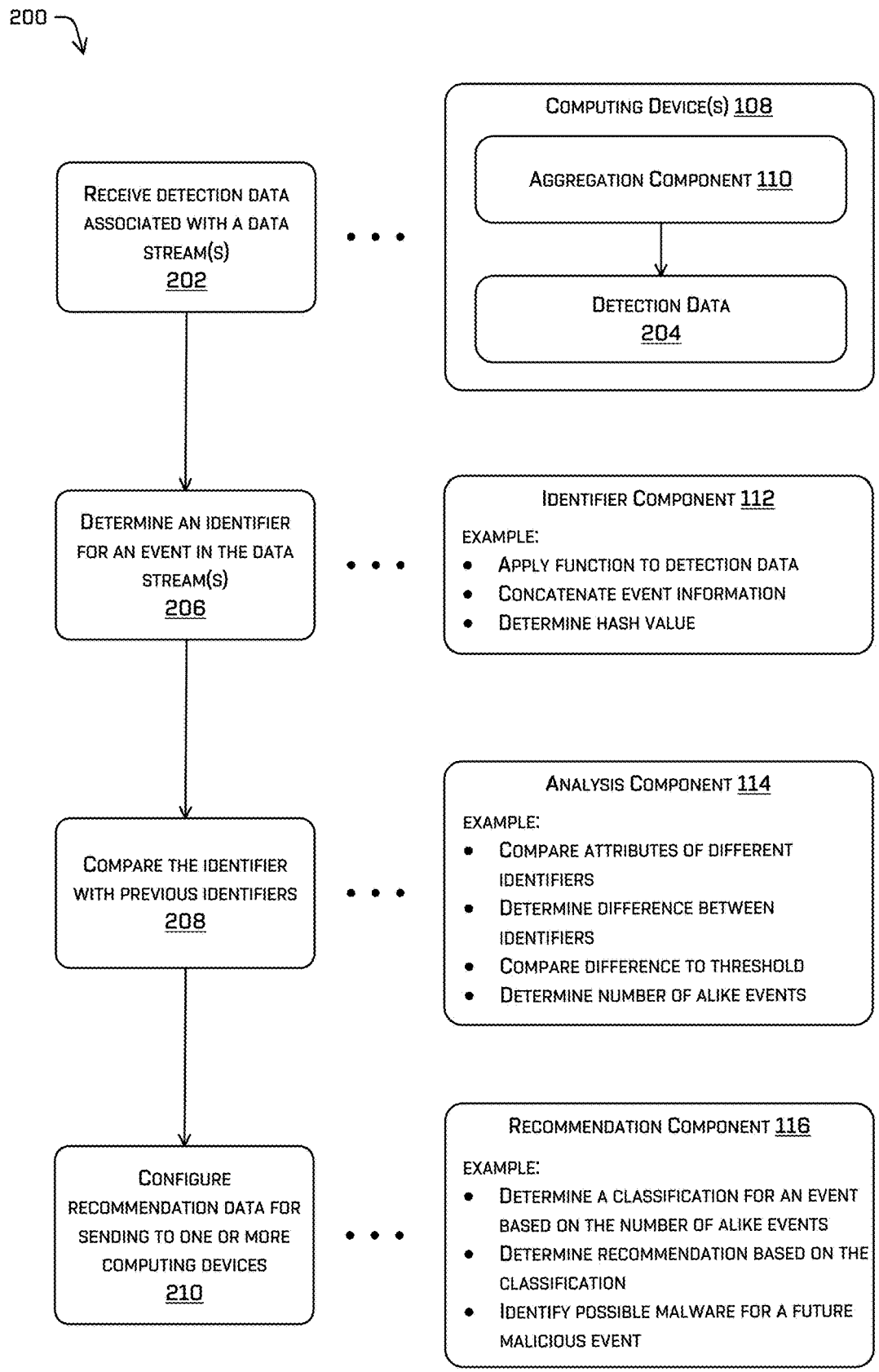
FIG. 2 is a pictorial diagram illustrating an example process to configure recommendation data by one or more example components to protect a data stream and/or a computing device from a malicious event, as described herein.

FIG. 2 is a pictorial diagram illustrating an example process 200 to configure recommendation data by one or more example components to protect a data stream and/or a computing device from a malicious event, as described herein. The example process 200 may be implemented by a computing device such as the computing device(s) 108 of FIG. 1 and/or the threat analysis service 402 of FIG. 4. The computing device(s) 108 can implement the aggregation component 110, the identifier component 112, the analysis component 114, and/or the recommendation component 116 to generate recommendation data for sending to a computing device (e.g., the host device(s) 102) to implement security protocols in a dynamic data stream (e.g., a data stream that changes over time).

An operation 202 can include receiving detection data associated with a data stream(s). In some examples, the computing device(s) 108 can implement the aggregation component 110 to aggregate, receive, or otherwise determine detection data 204 from one or more data streams. The detection data 204 can be associated with a host device, multiple host devices, one or more organizations, and/or one or more cloud environments serving a geographic area. The detection data can represent, for example, activity in a respective data stream such as changes to a file system, read/write activity, query results associated with one or more queries, and so on. In some examples, the aggregation component 110 can receive detection data from devices (e.g., the host devices 102) as the changes occur and/or from a storage device that replicates data stream activity.

In some examples, the aggregation component 110 can access data stream data from the data stream (or a database that replicated all previous activity in the data stream for a period of time). Generally, the detection data 204 can represent data associated with a security service which can include events executed by a processor of a host device and/or data associated with a data stream of the host device. In some examples, the detection data 204 can represent telemetry information received from one or more host devices in an environment remote from an environment associated with the computing device(s) 108 implementing the aggregation component 110.

An operation 206 can include determining an identifier for an event in the data stream(s). For example, the operation 206 can include the identifier component 112 applying a function to the detection data 204 to output a value that identifies the event relative to another event. Information describing an event that is included in the detection data 204 can be combined, or concatenated, to generate the identifier. For example, the identifier can represent a hash value generated from combining at least some of the information for the event. In some examples, the event information can include metadata for each detected event, as described herein. In various examples, the identifier can represent concatenated attributes of the event.

An operation 208 can include comparing the identifier with previous identifiers. For example, the operation 208 can include the analysis component 114 receiving previously generated identifiers from a storage device and comparing the identifiers to determine similarities and/or differences usable for determining a frequency of the event. The analysis component 114 can output data indicating a number of times the event, or events similar to the event, has occurred over a previous time. The analysis component 114 can, for example, compare attributes of different identifiers and compare a magnitude of a similarity or a difference to a threshold to ensure that the events are sufficiently alike and/or different.

An operation 210 can include configuring recommendation data for sending to one or more computing devices. For example, the operation 210 can include the recommendation component 116 generating recommendation data that identifies a vulnerability in a data stream(s) such as a likely portion of the data stream and/or host device for an actor to target with a specific technique. The recommendation data can also or instead identify a potential actor and/or possible malware associated with a future malicious event. Using the techniques described herein, recommendation data can be updated over time as a number of events change such that an event can change from being associated with a low number of occurrences to a higher number of occurrences. For example, as the number of occurrences increases, the recommendation data can indicate that the event is less likely to include malicious behavior and more likely to represent a non-malicious change.

By determining a number of like events, the analysis component 114 and/or the recommendation component 116 can output a classification usable for determining a security recommendation. The classification for an event can indicate a frequency of the event, such as uncommon, common, rare, unique, or some other language, and use the classification to determine whether to generate and/or transmit recommendation data.

In some examples, the recommendation data can include a graph or visualization to convey an actor, a technique, and/or malware used in a previous attack as well as a location of the attack within the data infrastructure (e.g., a portion of the host device, data stream, etc.).

Figure 3:
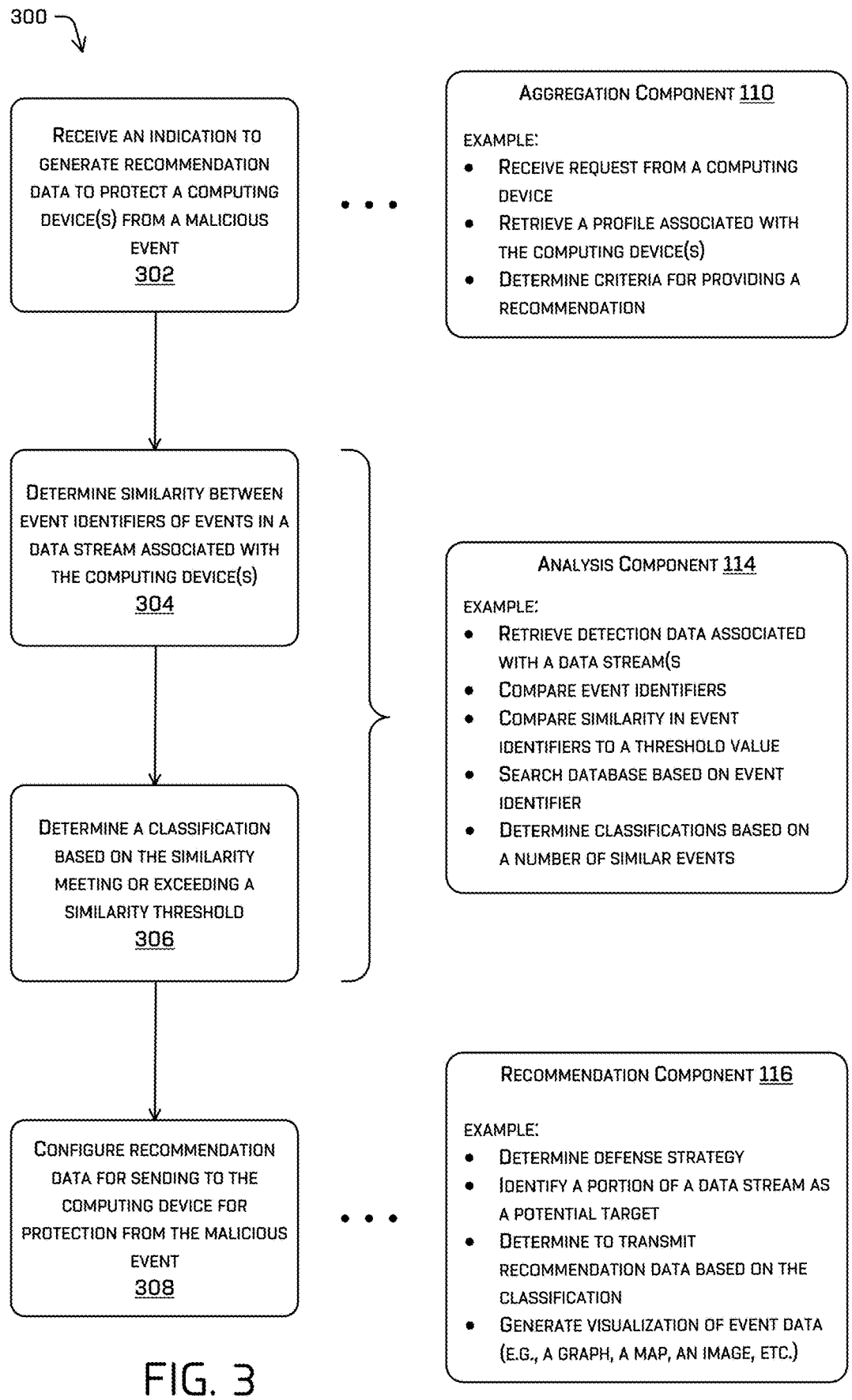
FIG. 3 is a pictorial diagram illustrating another example process to configure recommendation data by one or more example components to protect a data stream and/or a computing device from a malicious event, as described herein.

FIG. 3 is a pictorial diagram illustrating an example process 300 to configure recommendation data by one or more example components to protect a data stream and/or a computing device from a malicious event, as described herein. The example process 300 may be implemented by a computing device such as the computing device(s) 108 of FIG. 1 and/or the threat analysis service 402 of FIG. 4.

An operation 302 can include receiving an indication to generate recommendation data to protect a computing device(s) from a malicious event. For example, a security system implementing the computing device(s) 108 can receive a request from a computing device to provide recommendation data as part of a threat analysis service. In some examples, the recommendation data can be generated based at least in part on an expiration of a time period and/or a message requesting such a recommendation (e.g., from a host). However, in other examples the recommendation data can be generated in real-time as changes occur in a data stream.

An operation 304 can include determining similarity between event identifiers of events in a data stream associated with the computing device(s). For example, the analysis component 114 can compare the event identifiers and output an indication that two events are similar based on at last a portion of a first identifier (e.g., a first hash value) being similar to a second identifier (e.g., a second hash value). The analysis component 114 can generate the event identifiers based on monitoring a data stream. In some examples, the operation 304 can include determining similarity between event identifiers determined for different devices in a variety of organizations, cloud environments, and the like.

An operation 306 can include determining a classification based on the similarity meeting or exceeding a similarity threshold. For example, the analysis component 114 can output a classification for an event based on the similarity being sufficiently similar (e.g., similarities and/or differences between the identifiers are within a threshold). The classification can indicate a frequency of the event in the data stream and/or in multiple data streams in examples when detection data is received from different data streams. In some examples, the classification can be associated with a number of similar events occurring over a time period. For example, an event occurring less than five times can be classified as having a higher level of interest than events occurring hundreds of times.

In some examples, the operation 306 can include the analysis component 114 searching a database, memory, or other storage device for identifiers (e.g., keys) that may be similar within a threshold amount. For example, the analysis component 114 can search a database for stored identifiers that are similar to an identifier used as input.

An operation 308 can include configuring recommendation data for sending to the computing device for protection from the malicious event. For example, the recommendation component 116 can generate information for transmitting to the host device(s) 102 that identifies a portion of the data stream as a potential target, identifies actor behavior likely to occur in the future, a likely geographical location for a malicious event, and so on. In some examples, the recommendation component 116 can determine the recommendation data based at least in part on a number of events identifiers being identified as similar. In some examples, the recommendation component 116 can transmit the recommendation data based at least in part on the classification.

Figure 4:
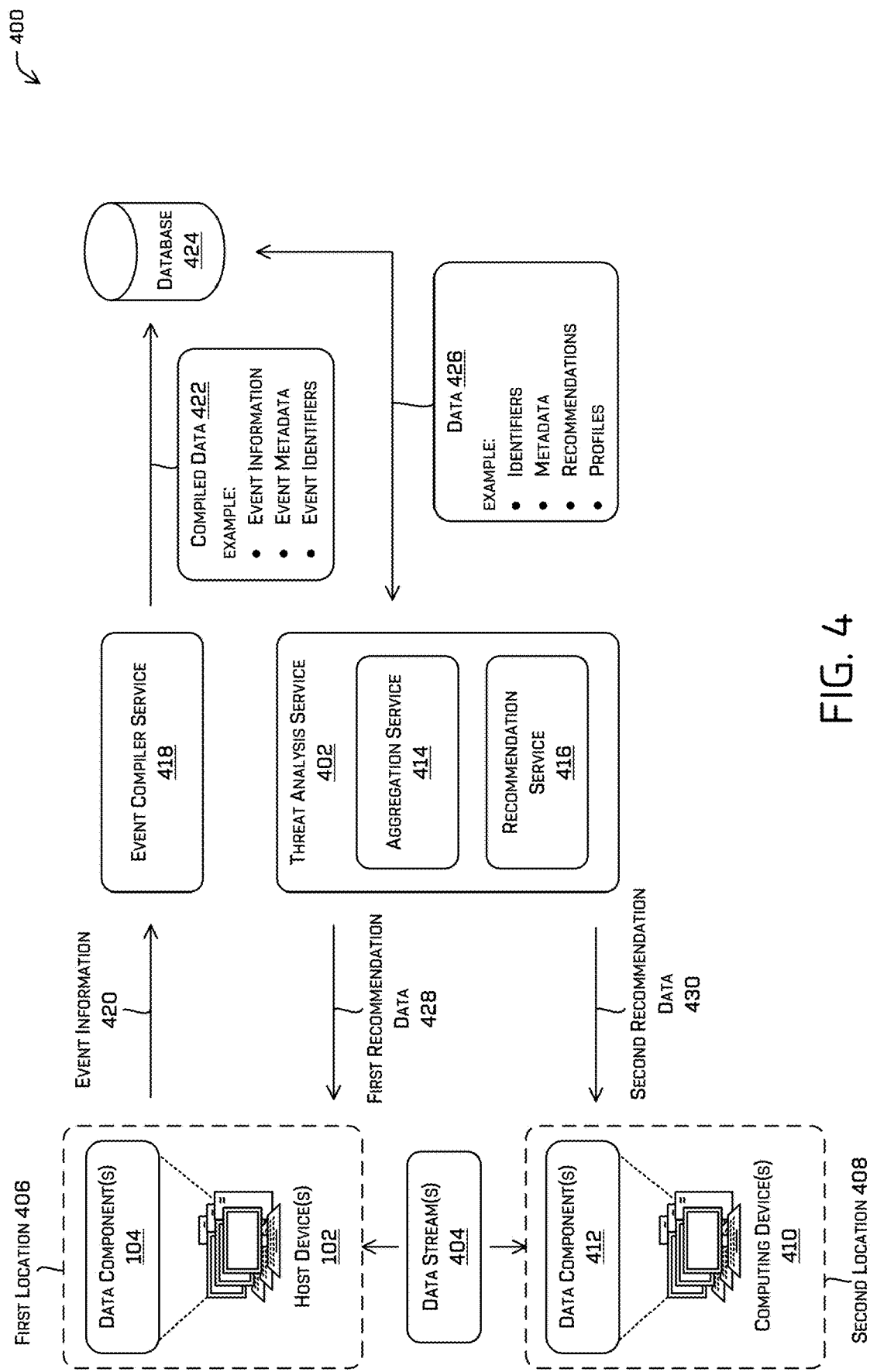
FIG. 4 is an illustration of an example environment in which an example threat analysis service implements techniques to exchange data with an example host device, as described herein.

FIG. 4 is an illustration of an example environment 400 in which an example threat analysis service implements techniques to exchange data with an example host device, as described herein. For example, a threat analysis service 402 can be implemented by the computing device(s) 108 to analyze data associated with previous threats, actor information, detections, and so on, to provide recommendation data associated with one or more data streams 404 in a first location 406 and/or a second location 408. The first location 406 can include the host device(s) 102 of FIG. 1 and the second location 408 can include one or more computing device(s) 410 (e.g., another geographical location associated with another organization) which further include one or more data components 412 (e.g., configured to include at least the functionality of the data component(s) 104). In various examples, the data stream(s) 404 can change dynamically over time as new instructions, processes, and so on are received into the data stream(s) 404.

As shown, the threat analysis service 402 includes an aggregation service 414 and a recommendation service 416 which can collectively perform the functionality of the aggregation component 110, the identifier component 112, the analysis component 114, and/or the recommendation component 116. In some examples, the functionality of the aforementioned components can be included in a single component (e.g., the aggregation component 110) or service (e.g., the recommendation service 416).

The environment 400 also includes an event compiler service 418 configured to receive event information 420 (e.g., detection data, data stream data, data describing one or more events over a time period, etc.) from the host device(s) 102 and output compiled data 422 that can include metadata, an event identifier, etc. Examples of the metadata and the event identifiers are discussed throughout this disclosure.

In various examples, the compiled data 422 can be stored in a database 424 for access by the threat analysis service 402. Whether or not the compiled data 422 is stored or sent directly to the threat analysis service 402, the recommendation service 416 can determine a defense strategy for the host device(s) 102 based on the event information 420 and/or the compiled data 422.

The database 424 (or another database) can also store event identifiers, classification data, query results, detection data, previously generated recommendation data, a user profile, an organization profile, malicious author profiles, etc. Data 426 can be exchanged between the database 424 and the threat analysis service 402 to perform operations including determining identifiers, comparing identifiers, determining similarity, determining a frequency of event occurrences, generating recommendation data, and so on. In some examples, the data 426 can represent a request from the threat analysis service 402 for event identifiers for determining similarities and/or differences among events occurring in the data stream(s) 404 of the first location 406 and/or the second location 408. The data 426 may also or instead represent metadata usable for generating event identifiers by the threat analysis service 402. In some examples, the data 426 can represent recommendation data shared with the host device(s) 102 and/or the computing device(s) 410 sent from the recommendation service 416 to the database 424.

In various examples, the data 426 can represent a user profile describing a user of a device, an organization file describing an organization associated with the host device 102 or the computing device 410, an author profile identifying an author of a previous malicious event in the data stream(s) 404.

The database 424 may store a list of similar events (e.g., based on comparisons between respective event identifiers) usable, for example, to generate recommendation data by the recommendation service 416. For example, determinations by the threat analysis service 402 such as numbers of different event types occurring over a time period can be stored for classifying events and/or determining recommendation data, as described herein.

In various examples, the recommendation service 416 can generate first recommendation data 428 for sending to the host device(s) 102. In some examples, the first recommendation data 428 can include a security recommendation that is based on a number of event identifiers that the threat analysis service 402 identifies associated with one or more host devices in the first location 406.

In various examples, the recommendation service 416 can generate second recommendation data 430 for sending to the computing device(s) 410 based at least in part on a number of event identifiers that the threat analysis service 402 identifies associated with the computing device(s) 410 in the second location 408.

In some examples, the first recommendation data 428 and/or the second recommendation data 430 can be determined based at least in part on events (and associated with metadata) occurring in the first location 406 and/or the second location 408. The first location 406 or the second location 408 can represent a region served by one or more cloud services and/or a geographical area.

Figure 5:
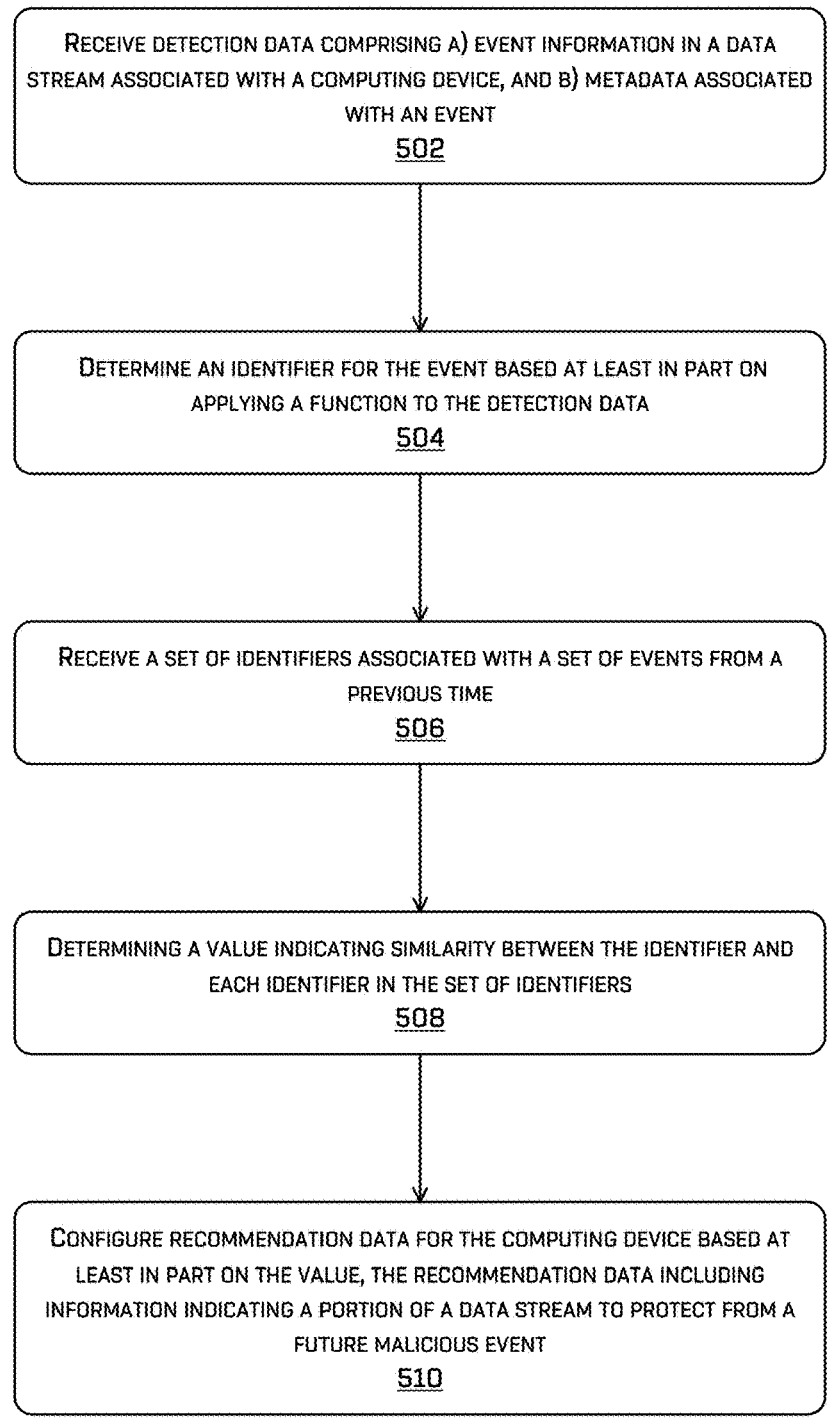
FIG. 5 is a flowchart depicting an example process for generating recommendation data usable to protect a data stream from a malicious event.

FIG. 5 is a flowchart depicting an example process 500 for generating recommendation data usable to protect a data stream from a malicious event. Some or all of the process 500 may be performed by one or more components in FIG. 1 and/or one or more services of FIG. 4, as described herein. For example, some or all of process 500 may be performed by the computing device(s) 108 and/or the threat analysis service 402.

At operation 502, the process can include receiving detection data comprising a) event information in a data stream associated with a computing device, and b) metadata associated with an event. In some examples, the operation 502 can include the computing device(s) 108 receiving detection data associated with previous activity in a data stream of a computing device (e.g., a potentially malicious process or thread, an instruction to write data to a memory, file, or the like). The detection data can include data received from a plurality of computing device, organizations, and/or locations to improve determinations of similar events.

At operation 504, the process can include determining an identifier for the event based at least in part on applying a function to the detection data. For instance, the computing device(s) 108 can input the detection data into a model (e.g., machine learned model, heuristic model, statistical model, or a combination thereof) that is configured to determine an identifier (e.g. a key) uniquely identifying the event relative to other events. In various examples, the computing device(s) 108 can implement the identifier component 112 to apply a hash function to event information and/or metadata associated an event in the detection data. In some examples, multiple identifiers can be determined (e.g., substantially simultaneously) for each event identified in the detection data.

At operation 506, the process can include receiving a set of identifiers associated with a set of events from a previous time. For example, the computing device(s) 108 can receive a set of identifiers from a database (e.g., the database 424), memory, or other storage device. In various examples, the set of identifiers can represent event identifiers determined by applying a function to different sets of metadata for each event.

At operation 508, the process can include determining a value indicating similarity between the identifier and each identifier in the set of identifiers. For instance, the computing device(s) 108 can compare identifiers and output a value (e.g., a classification) indicating whether or not identifiers in the set of identifiers are within a threshold similarity of the identifier associated with the event in the detection data.

At operation 510, the process can include configuring recommendation data for the computing device based at least in part on the value, the recommendation data including information indicating a portion of the data stream to protect from a future malicious event. For instance, the computing device(s) 108 can implement the recommendation component 116 to generate the recommendation data based at least in part on the value indicating similarity between the event identifiers.

In some examples, the operation 510 may be followed by an operation to transmit the recommendation data to the computing device for output by display device to protect the data stream from future malicious event. For example, the computing device(s) 108 can transmit the recommendation data over a computer network (e.g., the network(s) 106) to one or more host device associated with the organization.

Figure 6:
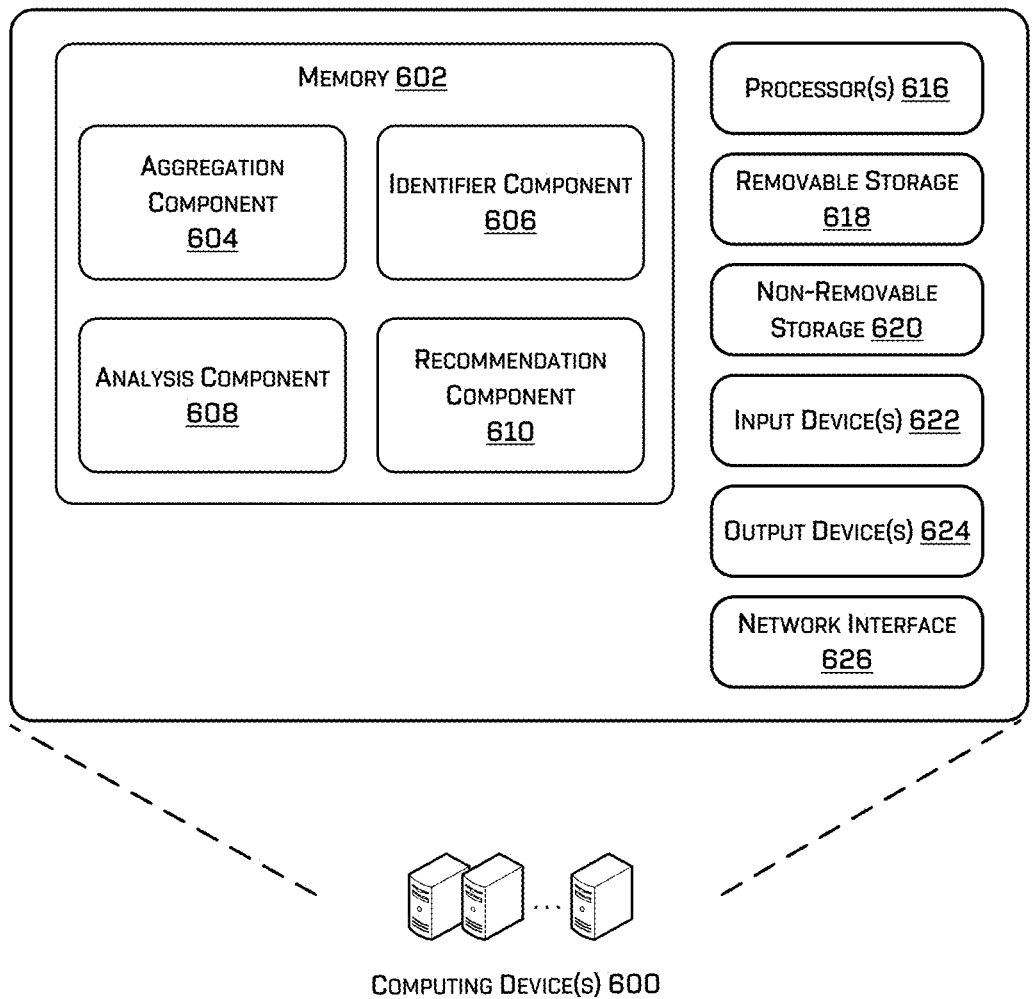
FIG. 6 is a block diagram of an illustrative computing architecture to implement the techniques describe herein.

FIG. 6 is a block diagram of an illustrative computing architecture of the computing device(s) 600. In some embodiments, the computing device(s) 600 can correspond to the host device(s) 102 or the computing device(s) 108 of FIG. 1. It is to be understood in the context of this disclosure that the computing device(s) 600 can be implemented as a single device or as a plurality of devices with components and data distributed among them. By way of example, and without limitation, the computing device(s) 600 can be implemented as various computing device 600(1), 600(2), . . . , 600(N) where N is an integer greater than 1.

As illustrated, the computing device(s) 600 comprises a memory 602 storing an aggregation component 604, an identifier component 606, an analysis component 608, and a recommendation component 610. Also, the computing device(s) 600 includes processor(s) 616, a removable storage 618 and non-removable storage 620, input device(s) 622, output device(s) 624, and network interface 626.

In various embodiments, memory 602 is volatile (such as RAM), non-volatile (such as ROM, flash memory, etc.) or some combination of the two. The aggregation component 110, the identifier component 112, the analysis component 114, and the recommendation component 116 stored in the memory 602 can comprise methods, threads, processes, applications or any other sort of executable instructions. The aggregation component 110, the identifier component 112, the analysis component 114, and the recommendation component 116 can also include files and databases.

In various embodiments, the computer-readable memory 602 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 602 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 602 may be part of the security service system.

The aggregation component 604 may receive and store any client entity information and their associated security information including observed activity patterns received from the data component 104 on the respective host device (s) 102. The aggregation component 604 may gather data from other modules that may be stored in a data store. In some embodiments, the aggregation component 604 may gather and store data associated with known information, such as domain information that is associated with known entities, for use as enrichment data by the recommendation component 610 (or other component).

In some examples, the aggregation component 604 can correspond to, or otherwise include the functionality of, the aggregation component 110 of FIG. 1.

In some instances, the identifier component 606 can correspond to, or otherwise include the functionality of, the identifier component 112 of FIG. 1.

In some instances, the analysis component 608 can correspond to, or otherwise include the functionality of, the analysis component 114 of FIG. 1.

In some instances, the recommendation component 610 can correspond to, or otherwise include the functionality of, the recommendation component 116 of FIG. 1.

In some instances, any or all of the devices and/or components of the computing device(s) 600 may have features or functionality in addition to those that FIG. 6 illustrates. For example, some or all of the functionality described as residing within any or all of the computing device(s) 600 may reside remotely from that/those computing device(s) 600, in some implementations.

The computing device(s) 600 may be configured to communicate over a telecommunications network using any common wireless and/or wired network access technology. Moreover, the computing device(s) 600 may be configured to run any compatible device operating system (OS), including but not limited to, Microsoft Windows Mobile, Google Android, Apple iOS, Linux Mobile, as well as any other common mobile device OS.

The computing device(s) 600 also can include input device(s) 622, such as a keypad, a cursor control, a touch-sensitive display, voice input device, etc., and output device(s) 624 such as a display, speakers, printers, etc. These devices are well known in the art and need not be discussed at length here.

As illustrated in FIG. 6, the computing device(s) 600 also includes the network interface 626 that enables the computing device(s) 600 of the security service system to communicate with other computing devices, such as any or all of the host device(s) 102.

FIGS. 2, 3, and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 3 may omit operation 302.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the process 500 may omit operation 510 and/or operation 514. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Normalization Techniques for Prevalence Keys

In some instances, the technologies described herein can be adapted to incorporate normalization techniques in the construction and use of prevalence keys. The term "prevalence key" as used herein refers to an identifier such as may be generated by the identifier component 112 illustrated in FIG. 1. Normalization techniques described herein can be used to normalize portions of data that are included in prevalence keys, which can thereby reduce the variance or number of different prevalence keys.

Reducing the number of different prevalence keys can be advantageous, as described herein, because it can enable more meaningful assessments of prevalence and corresponding security risks of events associated with prevalence keys. In general, lower prevalence events are associated with potentially higher security risk and flagging such lower prevalence events therefore assists analyst prioritization of which events to analyze in further detail.

In an example implementation, a File Integrity Monitoring (FIM) system can be provided as part of a cloud service which receives data from sensors or agents deployed within customer networks. The received data can pertain to file interaction events within the customer networks, and the FIM can support user interfaces (UIs) through which the customers can view and interact with lists of their respective file interaction events.

The UIs can provide tools for sorting and grouping file interaction events, and the UI can also optionally provide other useful information pertaining to the file interaction events, such as prevalence information which can be determined using the techniques described herein. The FIM can generate and use prevalence keys, as described herein, in order to determine prevalence information that can be supplied to customers via the UIs. In general, the prevalence information can indicate to the customer how common or prevalent is a given file interaction event.

For example, the prevalence information can indicate a file interaction event has a "unique" prevalence, meaning it is the only event of its kind or otherwise very rare. The prevalence information can alternatively indicate a file interaction event has a "low" prevalence, meaning there are a low number of other similar file interaction events, e.g., 1-10 or other low number of other similar file interaction events. The prevalence information can alternatively indicate a file interaction event has a "common" prevalence, meaning there are a relatively higher number of other similar file interaction events, e.g., 2-10 or more other similar file interaction events. The above example prevalence labels/categories are examples only, and other labels or threshold numbers of similar file interaction events can be applied in other embodiments.

Turning now to the general problem and motivation behind the disclosed techniques for generating and using prevalence keys, FIM faces a challenge to identify signal in huge amounts of noise. When there is too much noise, users are not able to effectively identify which file interactions/file changes are relevant for further analysis, which can lead to low usage of FIM tools.

Determining prevalence information can help solve the above problem, for instance by tagging file changes based on how common they are in a customer's network environment as well as how common they are among all customers. File changes that are not prevalent send a strong signal that something needs to be investigated. In contrast, file changes that are prevalent across a customer's network, as well as in other customer networks, can be and marked as common can optionally be treated as not needing to be analyzed or monitored.

Prevalence information can assist in identifying important file changes for users by limiting the number of similar file changes that the user sees and enabling the user to focus on file changes which are unique or otherwise low prevalence. However, the cardinality of prevalence keys to changes can often be 1:1, which can cause performance issues and generally leads to a high incidence of changes flagged as unique, therefore causing the prevalence to skew and making it less useful.

In an example, many customers configure FIM rules that capture a wide set of file changes that include temporary or transient files and files that are included in "namespaced" structures such as user directories and paths with random parts, e.g., universally unique identifiers (UUIDS), Internet Protocol (IP) addresses, timestamps, and/or datetime information). In these cases, the computed prevalence keys can be very unique even though the event change is very common across hosts within the customer's network and/or other customers' networks.

FIM systems according to this disclosure can identify data within parts of prevalence keys that can be normalized to reduce prevalence key variance. For example, prevalence keys can include, inter alia, entity path data. Subparts of entity path data can be normalized according to the techniques described herein.

One example subpart of entity path data that can be normalized is WINDOWS_SID data. Below are two different example entity path strings, each corresponding to a different file change, and each comprising different WINDOWS_SID information. Techniques according to this disclosure can recognize the WINDOWS_SID information in each of the entity path strings and can normalize the entity path strings by replacing the WINDOWS_SID information in both entity path strings with a placeholder such as {{WINDOWS_SID}}. The resulting normalized entity path string is the same for both of the example input entity path strings.

First Example Entity Path String:
\registry\machine\software\microsoft\windowsnt\current version\winlogon\volatileusermgrkey\s-1-5-21-1338325200-504760778-2079600828-681792\

Second Example Entity Path String:
\registry\machine\software\microsoft\windowsnt\current version\winlogon\volatileusermgrkey\s-1-5-21-1338325200-504760778-2079600828-523789\

Normalized Entity Path String:
\registry\machine\software\microsoft\windowsnt\current version\winlogon\volatileusermgrkey\{{WINDOWS_SID}}\

Techniques disclosed herein can normalize data, such as the above entity path strings, and can include the normalized data in prevalence keys corresponding to file changes. If other data included in prevalence keys (e.g., other than the above entity path data) is also the same across the file changes that include the normalized data, then a same prevalence key will be computed for multiple different file changes, thereby reducing the number of different prevalence keys and reducing noise.

In one aspect, the disclosed techniques apply to the construction of prevalence keys. By normalizing some of the data included in prevalence keys, the resulting prevalence keys can better assist in distinguishing common file changes from unique file changes. Prevalence keys can be understood as an aggregation mechanism to which an additional prevalence label (e.g., unique, low, or common) can be applied, optionally in real time as new file changes are introduced into the FIM system.

Example benefits of normalizing prevalence key data can include a significant reduction in prevalence key cardinality, improved aggregation time for "grouping by prevalence" screens, and a more accurate and less noisy data presentation for the customer to understand prevalence of their file changes, e.g., which changes are unique prevalence, low prevalence, and common prevalence.

Examples of this disclosure can use prevalence to identify file changes (or more generally, file interaction events) which are prevalent across a customer's network. A file change can be considered prevalent if a set of similar changes happen across multiple customers or systems.

In this context, similar can be defined for example as a modification that occurs on a same path and which has a same operation type {CREATE, DELETE, etc.). In the case of a CREATE, WRITE or SET operation, the registry value or file contents being created or modified can be the same (i.e., can have a same hash). Alternatively, when that information is unavailable, embodiments may enforce similarity by also analyzing other change attributes, e.g., deciding a change is similar to another if it's performed by a same process and/or from a same user account. Even more, examples can determine similarity based on whether changes are associated with a same Windows operating system version or Linux distribution.

The set of attribute values of a file change that can be used to match similar changes for prevalence is referred to as prevalence_key. The set of attribute values can include, e.g., path, operation, process_name, user_name, and other information described herein.

Implementations can also define the multiple customers or systems across which file changes are evaluated for similarity. For instance, some examples can establish a static or dynamic percentage threshold of customers or hosts. If similar file changes are observed across the threshold number of customers or hosts, embodiments can affirm that the file changes have a common prevalence level. If not, the file changes may instead be of unique or low prevalence levels. The minimum number or percentage of customers and/or hosts that should exist for a prevalence_key so that the associated file change will be considered prevalent can be referred to herein as a prevalence threshold.

In some embodiments, prevalence keys can be built by concatenating platform information, entity type information, action type information, entity path information, new entity path information, process image file name information, user ID information, and username information. Any of these portions of prevalence keys can be normalized. This disclosure will use entity path information as one example. The techniques described in connection with normalizing entity path can optionally be applied in the context of other portions of the prevalence key.

Many entity paths are long and have arbitrary names for directories which make similar changes for directories and filenames appear dissimilar. One example would be a process that creates the same files every day and places the date of the file creation in the file directory or file path. Even though the file changes (in this case, file creations) are the same, the file changes could be considered different since the paths included in the prevalence keys are different.

This high cardinality not only impacts performance, but also skews what should be considered unique vs. common. The primary use case of prevalence is to help customers understand which file changes are common and are therefore possible candidates to exclude from further monitoring, and conversely, which file changes are unique and should be handled as file changes of importance that may need further investigation and analysis.

Example subparts of entity path information which can be normalized include the following:

UUID: A Universally Unique Identifier (UUID) is a 128-bit label used for information in computer systems. The term Globally Unique Identifier (GUID) is also used, mostly in Microsoft systems.

ALPHANUM: Combinations of largely random alphabet characters and numbers which may or may not have additional characters.

NUMERIC: Collection of numbers occurring together.

VERSION: Recurring collection of numbers followed by dots to signify a version.

DATETIME: Combinations of differently represented dates which can include year, month, day and time which may include hour, minute, second, millisecond, and Coordinated Universal Time (UTC).

DATE: Combinations of differently represented dates which can include year, month, day.

WINDOWS_SID: A security identifier used to uniquely identify a security principal or security group in windows machines.

IPADDRESS: IP address identifies a network or device on the internet.

CACHE_DIR: Signifies a cache directory.

Each of the above example subparts of entity path information can be associated with a defined pattern which is used for normalization. When a normalization process observes data matching the defined pattern, it can replace the data with a placeholder. For example, an observed UUID pattern can be replaced with the placeholder "UUID," an observed ALPHANUM pattern can be replaced with the placeholder "ALPHANUM," and so on.

In an example normalization of an entity path, the below defined pattern can be used for UUID normalization:

[0-9a-f]{8}-[0-9a-f]{4}-[0-9a-f]{4}-[0-9a-f]{4}-[0-9a-f]{12}

Furthermore, the below defined pattern can be used for DATETIME normalization:

202[0-9]{1}((_l.)[0-9]{2}){5}.[0-9]{9,10}

The above defined patterns can be used to normalize an entity path such as the below entity path:

/var/lib/kubelet/pods/32b04624-0ade-4ffc-9a16-aecce4fda622/volumes/kubernetes.io~projected/kube-api-accessblfdq/ . . . 2023_10_21_08_07_43.3608280770/ca.crt Replacing the above defined patterns in the above entity path can yield the below normalized entity path:

/var/lib/kubelet/pods/{{uuid}}/volumes/kubernetes.io~projected/kube-apiaccessblfdq/ . . . {{datetime}}/ca.crt As can be observed from the above examples, the defined patterns can include sequences of number ranges, fixed data values, and wildcards which can be used to match sequences of information in portions of prevalence key data such as entity path.

In some examples, normalization techniques can maximize coverage while minimizing the number of patterns to be evaluated. For example, implementations can recognize the most commonly occurring patterns, e.g., the top 40-50 most common patterns. If a pattern is detected, a count can be incremented and metrics can be reported to denote the frequency of detecting the pattern. Some implementations can also determine how much time is used for evaluation of patterns for each prevalence key. Time measurement metrics can also be reported in order to assist in managing pattern matching overhead. Patterns can be added or subtracted from normalization based on how often they are recognized, and how much compute time they consume.

Solutions according to this disclosure are unique in part because they normalize parts of the information used to determine prevalence. The techniques disclosed herein can optionally be applied via regexes or artificial intelligence/machine learning (AI/ML) or heuristic algorithms. Embodiments can generate and use normalized representations of components to form new prevalence keys which match a relatively larger number of similar file change events. Furthermore, there are opportunities for normalization in all parts of prevalence keys and matching even more file changes, thus reducing noise. Using this functionality can result in faster processing of combined changes and less storage use. Since many changes now match a same prevalence key, customers have fewer changes to analyze. This can help customers conserve resources by analyzing higher priority file changes.

While the above example identifies and normalizes patterns in entity_path fields, it should be emphasized that embodiments can also identify and normalize patterns in other components of the prevalence key such as change type, process, user ID, etc. Furthermore, examples can use AI/ML or more heuristic algorithms like Levenshtein, fuzzy matching, or trie structures to identify new patterns and can use the new patterns to further normalize the components of the prevalence key.

For Levenshtein techniques, examples can measure the difference between two sequences of paths or other components of the prevalence key. The number of substitutions done for one sequence to become another sequence provides an indication of whether there is a pattern that the two sequences follow.

For trie structure techniques, tree nodes can comprise various directories in the filesystem. At the leaf node is the file which has changed. At the root node is a root directory on the machine. Examples can traverse from to the root to the leaf node and at every node can analyze files and directories and determine if a pattern emerges in the names of the directories or files.

An AI/ML approach can use a model that fits a relationship in which a certain user ID starts a process which creates/updates/deletes/renames a given file on a given entity_path. When the machine learning model detects a change that fits the model it can normalize it accordingly. For example, consider a python process that does an update in a Linux host. It will download update files and then start unzipping them. It will then copy them to a given folder and then will create and destroy some symlinks. A model can be built around this behavior, and the model can be used to identify such behavior in other Linux machines. Once we are able to fit such file changes in the model, we can normalize file changes accordingly. Some examples may see a change which does not follow the pattern and can mark it as a deviation from pattern which may be a change considered critical by a customer. Examples can also check a chronology of changes, determine how they deviate from a pattern, and mark them accordingly.

In a further aspect, the disclosed techniques enable identification of "noisy" directories. Noisy directories can be, e.g., those with many unique or low prevalence file change events. Embodiments may flag noisy directories for customer analysis. Embodiments may also analyze noisy directories to determine what kind of files are in the directories, e.g., log files, temp files, etc. Some examples may determine, e.g., percentages of files in noisy directories and may use a threshold percentage to suggest to customers that these directories can be excluded from monitoring. When file changes that are being analyzed have a rule associated with the file changes, examples may suggest changes to the rule such as an exclusion of certain nosy directories. Customers can review these suggestions and then decide if they would like to alter existing rules.

Figure 7:
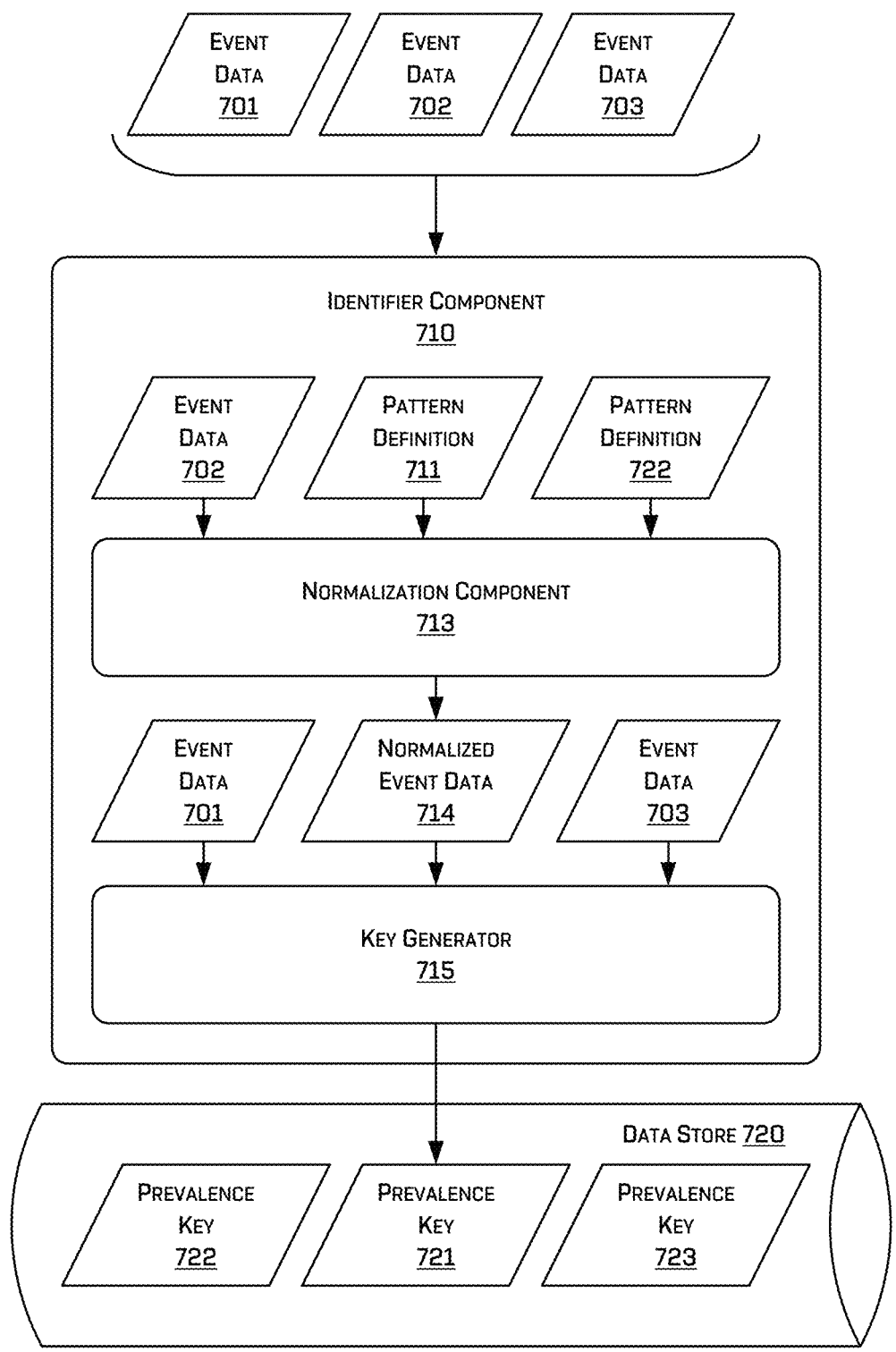
FIG. 7 is an illustration of an example identifier component configured to normalize at least some portions of key data, as described herein.

FIG. 7 is an illustration of an example identifier component 710 configured to normalize at least some portions of key data, as described herein. The identifier component 710 can implement the identifier components described herein in some embodiments, e.g., identifier component 112 and identifier component 606.

FIG. 7 comprises the identifier component 710, example event data 701, 702, and 703, and a data store 720. The identifier component 710 comprises a normalization component 713 and a key generator 715. The normalization component 713 can use pattern definitions, e.g., patter definition 711 and pattern definition 712, to normalize at least a portion of input event data, e.g., the event data 702, resulting in normalized event data 714. The key generator 715 can use input event data, e.g., event data 701 and event data 703, along with normalized event data such as normalized event data 702, to generate a prevalence key 721. The prevalence key 721 can be stored in the data store 720 along with other prevalence keys 722, 723.

In an example according to FIG. 7, the event data 701, event data 702, and event data 703 can comprise different portions of event data pertaining to a file interaction event at a customer computer network. A sensor at the customer computer network can detect the file interaction event and gather the event data 701, event data 702, and event data 703, and the sensor can send the event data 701, event data 702, and event data 703 to a cloud service comprising a FIM system which includes the identifier component 710. The event data 701, event data 702, and event data 703 can each comprise a portion of event data such as platform information, entity type information, action type information, entity path information, new entity path information, process image file name information, user ID information, and username information. Further event data can represent other portions of event data as well.

The identifier component 710 can be configured to identify the portion of received event data which is to be normalized by the normalization component 713, e.g., event data 702. The event data 702 can comprise, e.g., entity path information to be normalized.

The normalization component 710 can be configured to use the pattern definition 711 and pattern definition 712, along with any additional pattern definitions, to recognize subparts of the event data 702 which can be normalized. When a subpart matches a pattern definition, the subpart can be replaced with a placeholder value corresponding to the pattern definition. For example, a UUID pattern can be replaced with "UUID" as a placeholder, an ALPHANUM pattern can be replaced with "ALPHANUM" as a placeholder, etc. The normalized event data 714 can comprise the event data 702 as modified by placeholder insertions in place of recognized patterns.

In some embodiments, the key generator 715 can generate a prevalence key 721 as a straightforward combination of defined portions of event data which are associated with a particular file interaction event, e.g., the prevalence key 721 can be a combination of event data 701, normalized event data 714, and event data 703, optionally in a defined order or sequence. In other embodiments, the key generator 715 can further process any of the event data, e.g., by generating hash values, structuring the data, formatting the data, inserting separators such as commas or semicolons, or otherwise, prior to including the event data in the prevalence key 721.

Figure 8:
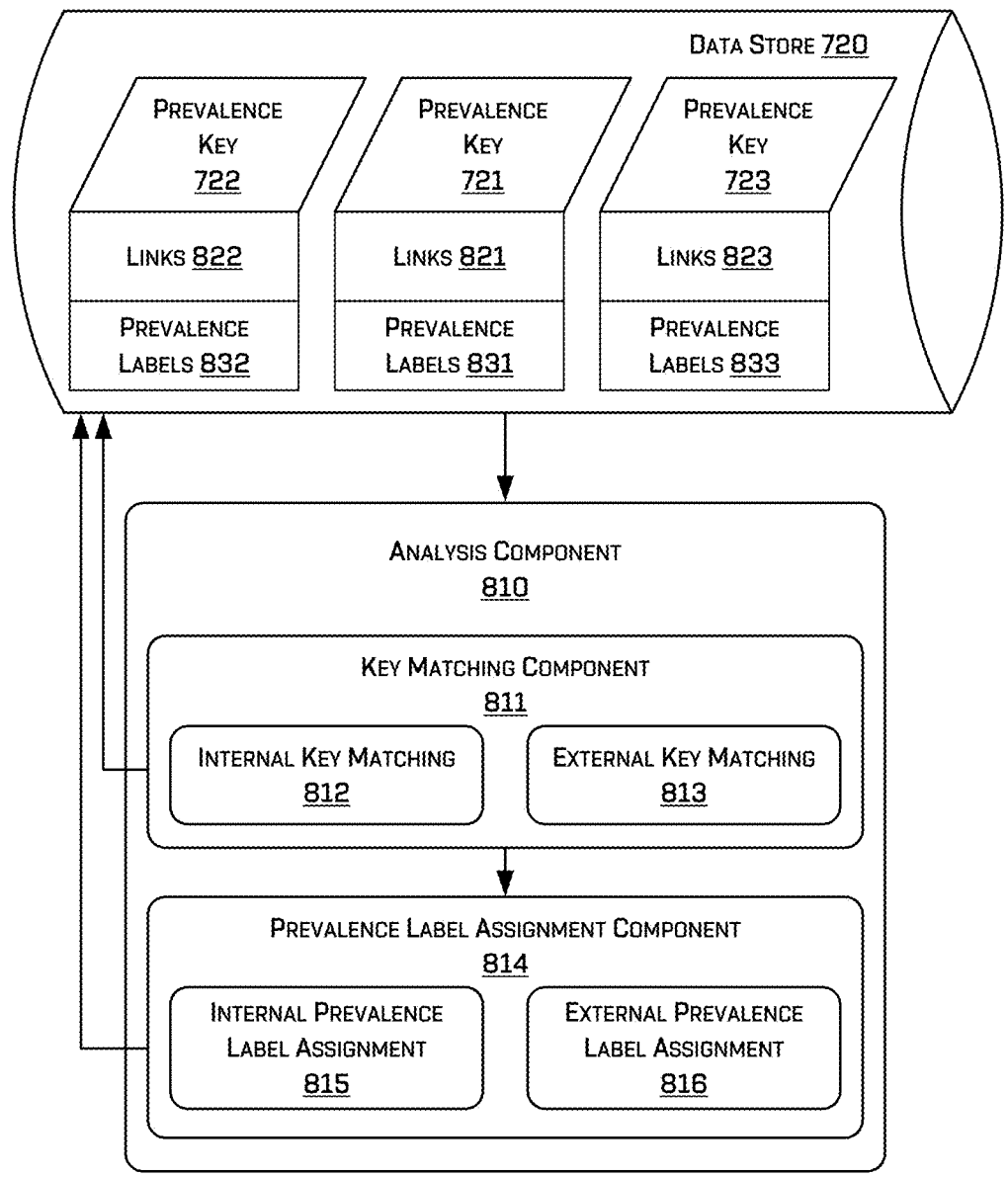
FIG. 8 is an illustration of an example analysis component configured to perform key matching on normalized prevalence keys and to assign prevalence labels, as described herein.

FIG. 8 is an illustration of an example analysis component 810 configured to perform key matching on normalized prevalence keys and to assign prevalence labels, as described herein. The analysis component 810 can implement the analysis components described herein in some embodiments, e.g., analysis component 114 and analysis component 608.

FIG. 8 comprises an analysis component 810 as well as the data store 720 introduced in FIG. 7, wherein the analysis component 810 can interact with and modify aspects of the data store 720. The analysis component 810 comprises a key matching component 811 and a prevalence label assignment component 814. The key matching component 811 comprises internal key matching 812 and external key matching 813. The prevalence label assignment component 814 comprises internal prevalence label assignment 815 and external prevalence label assignment 816.

The data store 720 comprises example additional data associated with the prevalence keys 721, 722, 723. The example additional data comprises links 822 and prevalence labels 832 which are associated with prevalence key 722, links 821 and prevalence labels 831 which are associated with prevalence key 721, and links 823 and prevalence labels 833 which are associated with prevalence key 723.

In an example according to FIG. 8, the key matching component 811 can be configured to identify different groups of identical or similar prevalence keys in the data store 720. For identification of similar prevalence keys, the key matching component 811 can use a similarity criterion such as a threshold percentage similarity. The key matching component 811 can optionally associate numbers of identical or similar prevalence keys with each respective prevalence key 721, 722, 723. The numbers can be updated as new prevalence keys enter the data store 720 which may match one or more of the prevalence keys 721, 722, 723.

The internal key matching 812 can determine, for each of prevalence keys 721, 722, 723, how many of the number of total matching prevalence keys are "internal" matching prevalence keys that are associated with a same customer ID as the prevalence key. The external key matching 813 can likewise determine, for each of prevalence keys 721, 722, 723, how many of the number of total matching prevalence keys are "external" matching prevalence keys that are not associated with a same customer ID as the prevalence key. The resulting number of internal matching prevalence keys and the resulting number of external matching prevalence keys can be associated/stored along with each prevalence key 721, 722, 723.

The prevalence label assignment component 814 can be configured to assign prevalence labels 831, 832, 833 to the prevalence keys 721, 722, 723, e.g., by associating/storing the prevalence labels 831, 832, 833 in the data store 720. The prevalence label assignment component 814 can determine prevalence labels 831, 832, 833 by applying thresholds or number ranges to the numbers of matching prevalence keys determined by the key matching component 811.

For example, the prevalence label assignment component 814 can assign a first prevalence label to a prevalence key which is associated with a number of matching keys that falls in a first range, and the prevalence label assignment component 814 can assign a second prevalence label to a prevalence key which is associated with number of matching keys that falls in a second range. Some example prevalence labels can comprise "unique," "low," and "common," as described herein, wherein each of these labels can be associated with a different number range, as also described herein. Additional or different labels and any desired number ranges or thresholds can be used.

The internal prevalence label assignment 815 can optionally assign internal prevalence labels that indicate numbers of internal matching prevalence keys, and the external prevalence label assignment 816 can likewise assign external prevalence labels that indicate numbers of external matching prevalence keys. As a result, the prevalence labels 831, 832, 833 can each optionally comprise an internal prevalence label and an external prevalence label.

Each of the prevalence keys 721, 722, 723 can optionally be associated, e.g., via links 821, 822, 823, with respective event data for file interaction events associated with the respective prevalence keys 721, 722, 723. Further information can also be linked to the prevalence keys 721, 722, 723 as appropriate, e.g., to support inclusion of further information in a UI as described in connection with FIG. 9.

Figure 9:
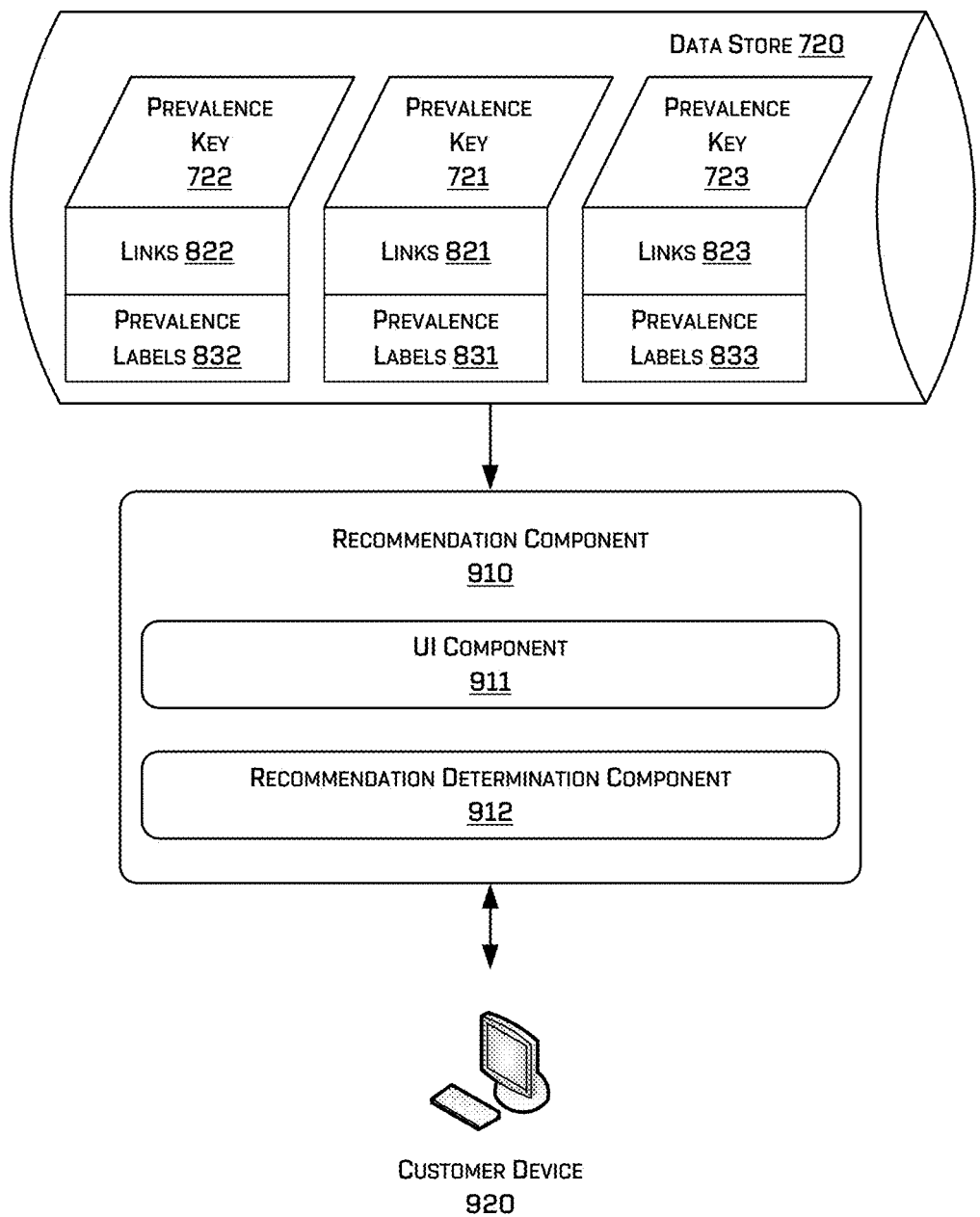
FIG. 9 is an illustration of an example recommendation component configured to include a user interface (UI) component that supports providing prevalence label information along with file interaction event data, as described herein.

FIG. 9 is an illustration of an example recommendation component 910 configured to include a user interface (UI) component 911 that supports providing prevalence label information along with file interaction event data, as described herein. The recommendation component 910 can implement the recommendation components described herein in some embodiments, e.g., recommendation component 116 and recommendation component 610.

FIG. 9 comprises recommendation component 910 as well as the data store 720 introduced in FIG. 7, and an example customer device 920. The recommendation component 910 can interact with the data store 720 in order to provide different views of the data stored therein to the customer device 920, as well as to make any recommendation determinations which can also be provided to the customer device 920. The recommendation component 910 comprises UI component 911 and recommendation determination component 912.

In an example according to FIG. 9, the customer device 920 may log into a FIM system in a cloud, and the FIM system can comprise the recommendation component 910. The UI component 911 can configure a UI for the customer device 920 to view event data associated with file interaction events at the customer device 920 and/or at a customer network including the customer device 920. The UI can comprise, e.g., a list of file interaction events, wherein each file interaction event in the list is supplemented with prevalence labels, e.g., the prevalence labels 831, 832, 833. The UI can format the list to include any desired event data, optionally formatted in separated columns, and the UI can optionally allow sorting the list according to various columns or sort criteria, including but not limited to sorting by prevalence label information. This allows the customer device 920 to view, e.g., a group of all file interaction events that have a same prevalence label, such as unique prevalence label. Similarly, the customer device 920 can view, e.g., a group of all file interaction events which are labeled internally unique, or externally unique, or any other desired groups of file interaction events associated with other prevalence labels.

The recommendation determination component 912 can perform additional security analysis of file interaction events, as described herein, and can optionally supply recommendations via the UI, or via another channel as desired for particular embodiments.

Figure 10:
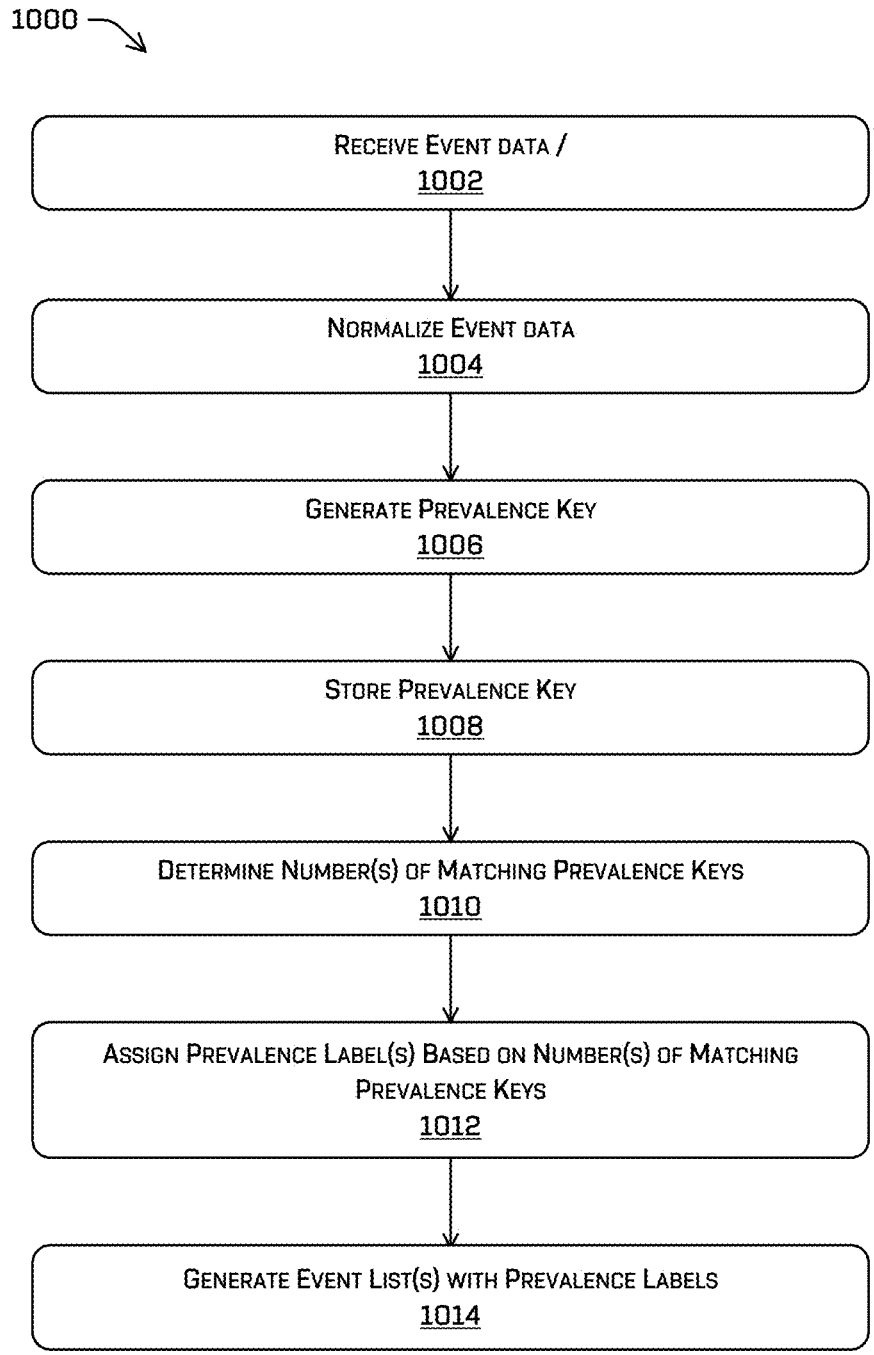
FIG. 10 is a flowchart depicting an example process for using prevalence keys to assign prevalence labels to file interaction event data, as described herein.

FIG. 10 is a flowchart depicting an example process for using prevalence keys to assign prevalence labels to file interaction event data, as described herein. By way of example and without limitation, the process is illustrated in FIG. 10 as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 10 can be performed at least in part by a computing device(s) 600 such as illustrated in FIG. 6, and which can implement a cloud service that provides a FIM system as described herein. In general, methods according to FIG. 10 can receive information about file interaction events which occurred at a customer's network or device. The file interaction events can be catalogued, and a list of the file interaction events can be made available for review by the customer. Furthermore, the FIM system can generate prevalence keys corresponding to the FIM file interaction events, and the FIM system can use the prevalence keys to determine prevalence labels to apply to the file interaction events. The prevalence labels can be included in the list of the file interaction events and embodiments can optionally furthermore sort the file interaction events based on the prevalence labels, so that customers can view groups of file interaction events associated with different prevalence labels.

At operation 1002, a FIM system can receive event data indicative of a file interaction event at a computer network. For example, the FIM system can receive event data from a sensor or agent which is deployed at a customer's computer network or customer device. The sensor or agent may have detected that a file on the customer's computer network was opened, changed, modified, or otherwise interacted with, and the sensor or agent captures and sends event data to the FIM.

The event data can include information such as a customer ID, a platform ID, an entity type ID, an action type ID, an entity path ID, a new entity path ID, a process image file name, a user ID, and/or a username. In some cases, the event data can include information can include some of the above information, and the FIM system can be configured to retrieve some other of the above information from other sources.

The customer ID can comprise an identifier associated with the customer computer network where the file interaction event occurred. The platform ID can be indicative of a computing platform where the file interaction event occurred. The entity type ID can be indicative of a type of file entity that is associated with the file interaction event. The action type ID can be indicative of a type of action associated with the file interaction event. The entity path ID can be indicative of a file or location path that locates a file associated with the file interaction event. The new entity path ID can be indicative of a new file or location path that locates a file associated with the file interaction event, e.g., when the file is moved. The process image file name can be indicative of a filename of a process image associated with the file interaction event. The user ID can be indicative of user ID of a user who initiated the file interaction event. The username can be indicative of username of the user who initiated the file interaction event. The event data provided herein is an example only, and other types of event data can be used in other embodiments.

At operation 1004, the FIM system can normalize some or all of the received event data. For example, a portion of the event data can be normalized by replacing a subpart of the portion of the event data with a placeholder element, resulting in normalized event data. One example portion of the event data can be entity path data. An example subpart of entity path data can comprise, e.g., a universally unique identifier (UUID), a combination of alphabet characters and numbers appearing together (ALPHANUM), a collection of numbers appearing together (NUMERIC), a collection of numbers followed by dots to signify a version (VERSION), a combination of characters representing a date (DATE), a combination of characters representing a time (DATE-TIME), a security identifier (WINDOWS_SID), an internet protocol address (IPADDRESS), and/or a cache directory (CACHE_DIR).

At operation 1006, the FIM system can generating a key, e.g., a prevalence key, comprising the normalized event data optionally as well as some or all of the other event data. The key can comprise for example one or more of a platform ID, an entity type ID, an action type ID, an entity path ID, a new entity path ID, a process image file name, a user ID, and/or a username, wherein one or more of the above portions is normalized. At operation 1008, the FIM system can store the key in a data store, optionally with a link to the event data associated with the key.

At operation 1010, the FIM system can determine number (s) of matching keys in the data store, wherein the matching keys match the key generated at 1006. The determination of matching keys can determine exact matches or similar matches having a defined percentage similarity or fitting another similarity definition. In some example, determining the number of matching keys in the data store can comprise determining an internal number of internal matching keys and an external number of external matching keys, wherein the internal matching keys are associated with file interaction events occurring within the customer's computer network, and wherein the external matching keys are associated with file interaction events occurring outside the customer's computer network.

At operation 1012, the FIM system can assign prevalence label(s) to the key generated at operation 1006, based on the number of matching keys. The prevalence label(s) can be selected from multiple different prevalence labels, wherein each of the multiple different prevalence labels is associated with a different number range for the number of matching keys. For instance, a "unique" prevalence label may be associated with a number range limited to zero (0) other matching keys. A "low" prevalence label may be associated with a number range limited of 1-10 other matching keys, or another low range. A "common" prevalence label may be associated with a number range limited of >10 other matching keys, or another higher range.

In some examples, assigning a prevalence label to the key based on a number of matching keys can comprise assigning an internal prevalence label based on an internal number of matching keys (corresponding to file interaction events occurring within the customer's network), and assigning an external prevalence label based on external number of matching keys (corresponding to file interaction events occurring outside the customer's network).

At operation 1014, the FIM system can generate a list of file interaction events including the file interaction event received at operation 1002. The list can include prevalence label information, for example, the listed information for the file interaction event received at operation 1002 can include the prevalence label(s) assigned at operation 1012. The list can be generated for example by a UI component that displays file interaction events and other information for customer analysis. In some embodiments, the prevalence keys are not provided as part of the list. Instead, the prevalence keys can optionally be used for internal purposes only within the FIM system and need not be shared.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving event data indicative of a file interaction event at a computer network;
normalizing a portion of the event data by replacing a subpart of the portion of the event data with a placeholder element, resulting in normalized event data;
generating a key comprising the normalized event data;
storing the key in a data store;
determining a number of matching keys in the data store, wherein the matching keys match the key; and
assigning a prevalence label to the key based on the number of matching keys, wherein the prevalence label is selected from multiple different prevalence labels, and wherein each of the multiple different prevalence labels is associated with a different number range for the number of matching keys.

2. The system of claim 1, wherein the operations further comprise generating a list of file interaction events including the file interaction event, wherein the list includes the prevalence label.

3. The system of claim 1, wherein the portion of the event data comprises an entity path.

4. The system of claim 1, wherein the subpart of the portion of the event data comprises a universally unique identifier, a combination of alphabet characters and numbers appearing together, a collection of numbers appearing together, a collection of numbers followed by dots to signify a version, a combination of characters representing a date, a combination of characters representing a time, a security identifier, an internet protocol address, or a cache directory.

5. The system of claim 1, wherein the key comprises one or more of a platform identifier, an entity type identifier, an action type identifier, an entity path identifier, a new entity path identifier, a process image file name, a user identifier, or a username.

6. The system of claim 1, wherein determining the number of matching keys in the data store comprises determining an internal number of internal matching keys and an external number of external matching keys, wherein the internal matching keys are associated with file interaction events occurring within the computer network and wherein the external matching keys are associated with file interaction events occurring outside the computer network.

7. The system of claim 6, wherein assigning the prevalence label to the key based on the number of matching keys comprises assigning an internal prevalence label based on the internal number and assigning an external prevalence label based on external number.

8. One or more non-transitory computer-readable media storing instructions executable by one or more processors, wherein the instructions, when executed, cause the one or more processors to perform operations comprising:
receiving, from a sensor deployed at a computer network, event data indicative of a file interaction event at the computer network;
normalizing a portion of the event data by replacing a subpart of the portion of the event data with a placeholder element, resulting in normalized event data;
generating a key based on the normalized event data;
determining a number of matching keys associated with other file interaction events, wherein the matching keys match the key,
wherein determining the number of matching keys comprises determining an internal number of internal matching keys and an external number of external matching keys, wherein the internal matching keys are associated with file interaction events occurring within the computer network and wherein the external matching keys are associated with file interaction events occurring outside the computer network; and
assigning a prevalence label to the key based on the number of matching keys.

9. The one or more non-transitory computer-readable media of claim 8, wherein the operations further comprise generating a list of file interaction events including the file interaction event, wherein the list includes the prevalence label.

10. The one or more non-transitory computer-readable media of claim 8, wherein the portion of the event data comprises an entity path.

11. The one or more non-transitory computer-readable media of claim 8, wherein the subpart of the portion of the event data comprises a universally unique identifier, a combination of alphabet characters and numbers appearing together, a collection of numbers appearing together, a collection of numbers followed by dots to signify a version, a combination of characters representing a date, a combination of characters representing a time, a security identifier, an internet protocol address, or a cache directory.

12. The one or more non-transitory computer-readable media of claim 8, wherein the key comprises one or more of a platform identifier, an entity type identifier, an action type identifier, an entity path identifier, a new entity path identifier, a process image file name, a user identifier, or a username.

13. The one or more non-transitory computer-readable media of claim 8, wherein assigning the prevalence label to the key based on the number of matching keys comprises assigning an internal prevalence label based on the internal number and assigning an external prevalence label based on external number.

14. The one or more non-transitory computer-readable media of claim 8, wherein the prevalence label is selected from multiple different prevalence labels, and wherein each of the multiple different prevalence labels is associated with a different number range for the number of matching keys.

15. A computer-implemented method comprising:
receiving event data indicative of a file interaction event:
normalizing a portion of the event data by replacing a subpart of the portion of the event data with a placeholder element, resulting in normalized event data,
wherein the subpart of the portion of the event data comprises a universally unique identifier, a combination of alphabet characters and numbers appearing together, a collection of numbers appearing together, a collection of numbers followed by dots to signify a version, a combination of characters representing a date, a combination of characters representing a time, a security identifier, an internet protocol address, or a cache directory;

generating a key comprising the normalized event data;

determining a number of matching keys associated with other file interaction events, wherein the matching keys match the key;

assigning a prevalence label to the key based on the number of matching keys; and generating a list of file interaction events including the file interaction event wherein the list includes the prevalence label.

16. The computer-implemented method of claim 15, wherein the portion of the event data comprises an entity path.

17. The computer-implemented method of claim 15, wherein determining the number of matching keys in the data store comprises determining an internal number of internal matching keys and an external number of external matching keys, wherein the internal matching keys are associated with file interaction events occurring within a computer network and wherein the external matching keys are associated with file interaction events occurring outside the computer network.

18. The computer-implemented method of claim 15, wherein the prevalence label is selected from multiple different prevalence labels, and wherein each of the multiple different prevalence labels is associated with a different number range for the number of matching keys.

* * * * *